(12) United States Patent
Shinoda et al.

(10) Patent No.: US 7,515,436 B2
(45) Date of Patent: Apr. 7, 2009

(54) COMMUNICATION UNIT

(75) Inventors: Hiroyuki Shinoda, Kanagawa (JP);
Naoya Asamura, Tokyo (JP); Keiji Matsumoto, Chiba (JP); Yuichi Kasahara, Saitama (JP); Xinyu Wang, Tokyo (JP); Tachio Yuasa, Kanagawa (JP); Takayuki Iwamoto, Chiba (JP); Yousuke Morishita, Tokyo (JP)

(73) Assignee: Cell Cross Corporation, Tokyo (JP)

( * ) Notice: Subject to any disclaimer, the term of this patent is extended or adjusted under 35 U.S.C. 154(b) by 665 days.

(21) Appl. No.: 10/561,427

(22) PCT Filed: Jun. 18, 2004

(86) PCT No.: PCT/JP2004/008619

§ 371 (c)(1),
(2), (4) Date: Dec. 19, 2005

(87) PCT Pub. No.: WO2004/114556

PCT Pub. Date: Dec. 29, 2004

(65) Prior Publication Data

US 2007/0097562 A1    May 3, 2007

(51) Int. Cl.
*H05K 1/11* (2006.01)
*H05K 1/14* (2006.01)
(52) U.S. Cl. .................. 361/794; 361/782; 361/785; 361/795
(58) Field of Classification Search ......... 361/760–764, 361/780–785, 794–795; 174/255, 259–261
See application file for complete search history.

(56) References Cited

U.S. PATENT DOCUMENTS 5,764,491 A * 6/1998 Tran ........................... 361/794
5,898,576 A * 4/1999 Lockwood et al. .......... 361/782
5,912,809 A * 6/1999 Steigerwald et al. ........ 361/780

(Continued)

FOREIGN PATENT DOCUMENTS

JP    2001-237505    8/2001
JP    2004-007448    1/2004
WO   WO 03/034625 A1   4/2003

*Primary Examiner*—Tuan T Dinh
(74) *Attorney, Agent, or Firm*—Howard & Howard Attorneys PLLC

(57) ABSTRACT

In a communication unit 100, a ground layer section 101 which is a sheet-like conductive material and a power-source layer section 102 which is a sheet-like conductive material are laid out in such a way that their one sides face each other, a voltage is applied in such a way that the power-source layer section 102 has a predetermined reference electric potential to the ground layer section 101, a plurality of conductive layer sections 103 which are sheet-like conductive materials are laid out between the ground layer section 101 and the power-source layer section 102, each conductive layer section 103 and the power-source layer section 102 are coupled together by a pull resistor section 104, a transmission communication element transmits a signal by changing the electric potential of the conductive layer section 103 connected to that communication element with respect to the ground layer section 101, and a reception communication element receives the signal by directly or indirectly detecting a change in electric potential of the conductive layer section 103.

18 Claims, 16 Drawing Sheets

U.S. PATENT DOCUMENTS

| | | |
|---|---|---|
| 6,198,362 B1 * | 3/2001 | Harada et al. ................. 333/12 |
| 6,353,540 B1 * | 3/2002 | Akiba et al. ................. 361/794 |
| 6,418,031 B1 * | 7/2002 | Archambeault ............. 361/762 |
| 6,975,517 B1 * | 12/2005 | Kwong et al. ............... 361/763 |
| 7,148,425 B2 * | 12/2006 | Wu et al. .................... 174/255 |
| 7,215,132 B2 * | 5/2007 | Yokota ....................... 324/763 |

* cited by examiner

TOP PLAN VIEW (PLAN VIEW)

A-A CROSS-SECTIONAL VIEW

EQUIVALENT CIRCUIT DIAGRAM

COMMUNICATION UNIT

TECHNICAL FIELD

The present invention relates to a sheet-like communication unit that has a plurality of communication elements which are embedded in the communication unit, and transmits information as the communication elements communicate with neighboring communication elements to form a network

BACKGROUND ART

The inventors of this application have proposed a technology regarding a sheet-like (cloth-like, paper-like, foil-like, tabular, or the like, which spreads in a plane and is thin) communication unit in which a plurality of communication elements are embedded. For example, proposed in the following literature is a communication unit that transmits a signal as a plurality of communication elements, embedded in a sheet-like member (hereinafter, called "sheet-like body") without forming individual wirings, relay the signal. Patent Literature 1: Unexamined Japanese Patent Publication KOKAI Publication No. 2004-007448

According to the technology disclosed in the "Patent Literature 1", the communication elements are laid out at the vertices of a grid-like, triangular, or honeycomb-like drawing on the surface of the sheet-like body. Each communication element communicates only with other communication elements laid out around it by using the fact that a change in electric potential generated by the communication element is to be intensively transmitted to the neighborhood, but transmitted to a distant place in an attenuation manner.

This local communication allows successive transmission of a signal between the communication elements, thereby transmitting the signal to the destination communication element The plurality of communication elements are hierarchically divided by management functions, and routing data is set in each hierarchy, so that a signal can be efficiently transmitted to the final destination communication element.

DISCLOSURE OF THE INVENTION

Problem to be Solved by the Invention

In such a communication unit that has communication elements approximately regularly embedded in the sheet-like body, and transmits information as the communication elements communicate form a network, various new technical proposals are strongly desired to meet various demands and applications regarding how to structure the sheet-like body, and how to lay out the communication elements.

The invention meets such demands, and it is an object of the invention to provide a sheet-like communication unit that transmits information and transmits information as the communication elements communicate with neighboring communication elements to form a network.

Means for Solving the Problem

To achieve the object, the following subject matters are disclosed according to the principle of the invention.

A communication unit according to the first aspect of the invention comprises a ground layer section, a power-source layer section, a plurality of conductive layer sections, a plurality of coupling resistor sections, a plurality of pull resistor sections, and a plurality of communication element sections, and is structured as follows.

That is, the ground layer section is a sheet-like conductive material.

The power-source layer section is a sheet-like conductive material laid out opposite to the ground layer section, and whose electric potential to the ground layer section becomes a predetermined reference electric potential.

The plurality of conductive layer sections are sheet-like conductive materials laid out between the ground layer section and the power-source layer section.

The plurality of coupling resistor sections are laid out between the ground layer section and the power-source layer section, and couple adjacent ones of the plurality of conductive layer sections with each other.

The plurality of pull resistor sections which couple the power-source layer section and the plurality of conductive layer sections, respectively.

The pull resistor means either a pull-up resistor or a pull-down resistor, and whether it functions as the pull-up resistor to the ground layer section or functions as the pull-down resistor depends on whether the electric potential of the power-source layer section is positive or negative. The same is true of the following.

As the pull resistor section, a resistor which couples the power-source layer section and the conductive layer section may be used, or the clearance between those sections may be filled with a material having a certain resistivity. The same is true of the following.

The power-source layer section is the plurality of communication elements which are respectively associated with the plurality of conductive layer sections, transmit information by changing electric potentials of the associated conductive layer sections to the ground layer section, and acquire the transmitted information by detecting changes in electric potentials to be propagated to those conductive layer sections which are adjacent to the associated conductive layer sections through any of the plurality of coupling resistor sections.

A communication unit according to another aspect of the invention comprises a ground layer section, a power-source layer section, first and second conductive layer sections, a coupling resistor section, first and second pull resistor sections, and first and second communication element sections, and is structured as follows.

That is, the ground layer section is a sheet-like conductive material.

The power-source layer section is a sheet-like conductive material laid out opposite to the ground layer section, and whose electric potential to the ground layer section becomes a predetermined reference electric potential.

The first conductive layer section and the second conductive layer section are sheet-like conductive materials laid out between the ground layer section and the power-source layer section.

The coupling resistor section is laid out between the ground layer section and the power-source layer section, and couples the first conductive layer section and the second conductive layer section with each other.

The first pull resistor section couples the power-source layer section and the first conductive layer section.

The second pull resistor section couples the power-source layer section and the second conductive layer section.

The first communication element section changes the electric potential of the first conductive layer section to the ground layer section in accordance with information to be transmitted.

The second communication element section acquires the transmitted information by detecting a change in electric potential to be propagated to the second conductive layer section through the coupling resistor section as the electric potential of the first conductive layer section to the ground layer section changes.

The communication unit of the invention may be structured in such a way that the first communication element section lets a current to flow between the first communication element section and the ground layer section to change the electric potential of the first conductive layer section to the ground layer section, and the second communication element section compares an electric potential of the second communication element section to the ground layer section with the predetermined reference electric potential, and detects a change in electric potential.

In the communication unit of the invention, the first communication element section and the second communication element section may be so structured in such a way as to be operated with a potential difference between the power-source layer section and the ground layer section as power.

The communication unit of the invention may be structured in such a way that the first conductive layer section, the second conductive layer section and the coupling resistor section constitute a sheet-like signal layer section which is laid out between the ground layer section and the power-source layer section, and the first communication element section and the second communication element section are operated with a potential difference between the signal layer section and the ground layer section as power.

The communication unit of the invention may be structured in such a way that the signal layer section comprises a sheet-like conductive material whose resistivity changes locally, and an average resistivity of an area of the sheet-like conductive material corresponding to the first conductive layer section and the second conductive layer section is smaller than an average resistivity of an area of the sheet-like conductive material corresponding to the coupling resistor section.

The communication unit of the invention may be structured in such a way that the first conductive layer section and the second conductive layer section have approximately square shapes, and the first communication element and the second communication element are respectively laid out at centers of the first conductive layer section and second conductive layer section. Instead of the approximate square shape, a polygon such as an approximately equilateral triangle, or an approximately equal hexagon which can fill up a plane may be used. The communication element may be laid out at other than the center.

A communication unit according to the other aspect comprises a ground layer section, a power-source layer section, a plurality of conductive layer sections, a plurality of pull resistor sections, and a plurality of communication elements, and is structured as follows.

That is, the ground layer section is a sheet-like conductive material.

The power-source layer section is a sheet-like conductive material laid out opposite to the ground layer section, and whose electric potential to the ground layer section becomes a predetermined reference electric potential.

The plurality of conductive layer sections are sheet-like conductive materials laid out between the ground layer section and the power-source layer section.

The plurality of pull resistor sections couple the power-source layer section and the plurality of conductive layer sections, respectively.

The plurality of communication element sections couple adjacent ones of the plurality of conductive layer sections with each other.

Each of the plurality of communication element sections changes an electric potential of one of the conductive layer sections coupled by the communication element section with respect to the ground layer section in accordance with information to be transmitted, and acquires the transmitted information by detecting a change in an electric potential of the other one of the conductive layer sections coupled by the communication element section with respect to the ground layer section.

A communication unit according to another aspect of the invention comprises a ground layer section, a power-source layer section, a conductive layer section, a pull resistor section, and first and second communication element sections, and is structured as follows.

That is, the ground layer section is a sheet-like conductive material.

The power-source layer section is a sheet-like conductive material laid out opposite to the ground layer section, and whose electric potential to the ground layer section becomes a predetermined reference electric potential.

The conductive layer section is a sheet-like conductive material laid out between the ground layer section and the power-source layer section.

The pull resistor section couples the power-source layer section and the conductive layer section.

The first communication element section changes an electric potential of the conductive layer section to the ground layer section in accordance with information to be transmitted.

The second communication element section acquires the transmitted information by detecting a change in the electric potential of the conductive layer section to the ground layer section.

The communication unit of the invention may be structured in such a way that the first communication element section lets a current to flow between the first communication element section and the ground layer section to change the electric potential of the first conductive layer section to the ground layer section, and the second communication element section compares an electric potential of the second communication element section to the ground layer section with the predetermined reference electric potential, and detects a change in electric potential.

In the communication unit of the invention, the first communication element section and the second communication element section may be structured in such a way as to be operated with a potential difference between the power-source layer section and the ground layer section as power.

In the communication unit of the invention, the first communication element section and the second communication element section may be structured in such a way as to be operated with a potential difference between the signal layer section and the ground layer section as power.

The communication unit of the invention may be structured in such a way that the conductive layer section has an approximately square shape, and the first communication element section and the second communication element section are respectively laid out at centers of different edges of the approximate square of the conductive layer section.

In addition, the communication unit of the invention may be structured in such a way that the plurality of conductive layer sections are laid out in such a manner as to sandwich the power-source layer section with the ground layer section or sandwich the ground layer section with the power-source layer section instead of being laid out between the ground layer section and the power-source layer section.

That is, the positions of the plurality of conductive layer sections, power-source layer section, and ground layer section may be changed with one another.

Effect of the Invention

According to the invention, it is possible to provide a sheet-like communication unit that has a plurality of communication elements which are embedded in the communication unit, and transmits information as the communication elements communicate with neighboring communication elements to form a network.

Figure 1A:
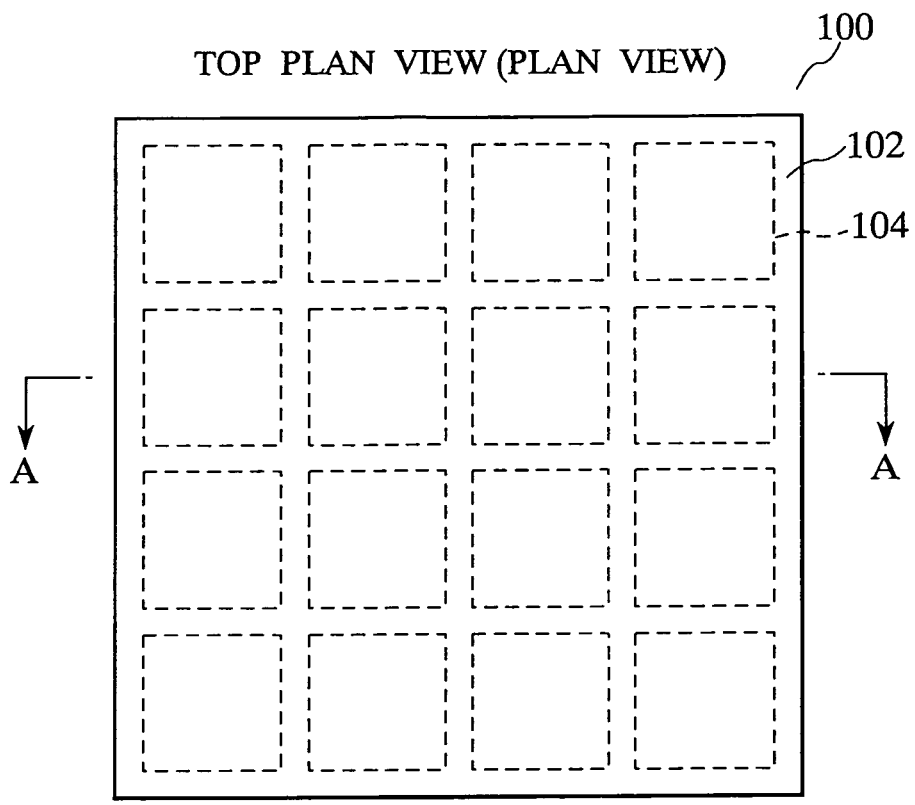
FIG. 1 An explanatory diagram for explaining the basic structure of the invention.

DESCRIPTION OF REFERENCE NUMBERS 100 communication unit
101 ground layer section
102 power-source layer section
103 conductive layer section
104 pull resistor section
105 circuit of transmission communication element
106 circuit of reception communication element
107 coupling resistor section
301 communication element section
401 communication element
501 communication circuit
502 contact
503 contact
504 contact
511 reception circuit
512 transmission circuit
513 control circuit
701 communication element
702 contact
703 contact
704 diode
705 resistor
706 capacitor
711 reception circuit
712 transmission circuit
713 control circuit
801 signal layer section
901 communication element
951 resistor
952 good conductor
971 coupling body

BEST MODE FOR CARRYING OUT THE INVENTION

Embodiments of the invention will now be explained below The embodiments to be discussed below are for explanation, and do not for limit the scope of the invention Accordingly, a person skilled in the art can adapt embodiments which replace each component or all components with equivalents, and-those embodiments are to be included within the scope of the invention.

(Basic Structure)

Figure 1B:
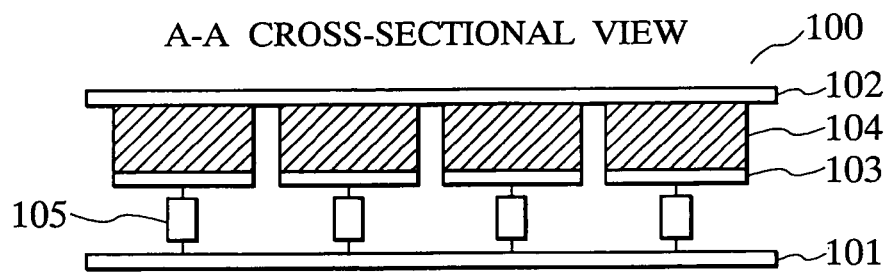
Figure 1C:
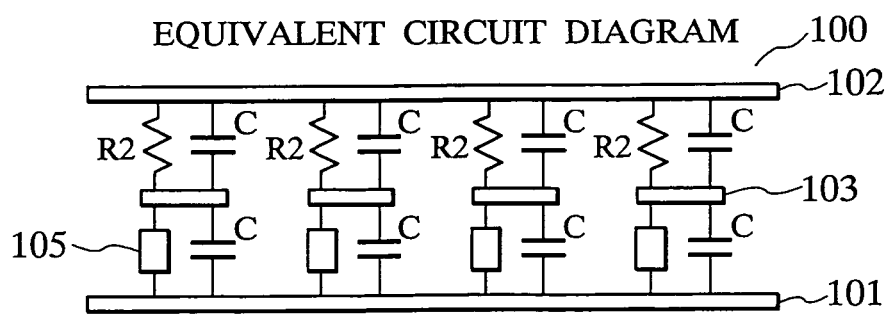

FIG. 1 is an explanatory diagram for explaining the basic structure of the invention FIG 1(a)is a top plan view (plan view), FIG 1(b) is a cross-sectional view, and FIG. 1(c) is an equivalent circuit diagram. An explanation will be hereinafter given with reference to this figure.

In a communication unit 100, a ground layer section 101 which is a sheet-like (foil-like) conductive material (good conductor) and a power-source layer section 102 which is a sheet-like (foil like) conductive material (good conductor) are laid out in such a way that their one sides face with each other. The clearance between them is approximately constant, and because a voltage is applied to the power-source layer section 102 in such a way that the power-source layer section 102 becomes a predetermined reference electric potential to the ground layer section 101, they are laid out like a plate capacitor.

a plurality of conductive layer sections 103 having smaller shapes than those of these sheet-like bodies are laid out between the ground layer section 101 and the power-source layer section 102. Accordingly, the space between each conductive layer section 103 and the power-source layer section 102, and the space between each conductive layer section 103 and the ground layer section 101 also structurally look like plate capacitors.

The clearance between each conductive layer section 103 and the ground layer section 101 are also constant, the shapes of the individual conductive layer sections 103 are squares in FIG. 1, and the individual conductive layer sections 103 are laid out like grids as viewed from above at equal intervals. In this figure, 4×4=16 conductive layer sections 103 are laid out, but their layout number can be appropriately changed, and, in general, a larger number of them are laid out Members with predetermined resistivities are filled between individual conductive layer sections 103 and the power-source layer section 102, and constitute a plurality of pull resistor sections 104.

Because the pull resistor sections 104 allow electric charges to pass, and a voltage is applied to the power-source layer section 102 in such a way that the power-source layer section becomes the predetermined reference electric potential, the electric potentials of the individual conductive layer sections 103 to the ground layer section 101 also become the reference electric potential.

An equivalent circuit such as one illustrated in FIG. 1(c) is constituted in this manner. That is, a resistance corresponding to the pull resistor section 104 is R2, and the capacitance of a part which constitutes a capacitor is C.

In a case of such a structure, when a current is let to pass with a circuit 105 formed between a conductive layer section 103 and the ground layer section 101, the electric potential of that conductive layer section 103 changes. For example, when the electric potential of the power-source layer section 102 is positive and a current is let to flow to the ground layer section 101 from the conductive layer section 103, the electric potential of the conductive layer section 103 decreases.

In this way, the communication element transmits a signal by forming the circuit 105 between the conductive layer section 103 and the ground layer section 101, and letting a current flow to thereby change the electric potential of the conductive layer section 103.

In a case where the communication elements receive signals, on the other hand, there are two conceivable methods such as detecting changes in the electric potentials to be propagated from the individual conductive layer sections 103 and directly detecting changes in the electric potentials of the individual conductive layer sections 103. In view of the layout of the communication elements, the former is called a central-layout type, and the latter is called a boundary-layout type.

(Central-Layout Type)

In a case of the central-layout type, coupling the adjacent conductive layer sections 103 by a resistor allows a change in voltage to be propagated.

FIG. 2 is an explanatory diagram illustrating how individual conductive layer sections are coupled together by resistors which are coupling resistors. FIG. 2(a) is a top view, FIG. 2(b) is a cross-sectional view, FIG. 2(c) is an equivalent circuit diagram, and FIG. 2(d) is an explanatory diagram illustrating how a change in electric potential propagates. An explanation will be hereinafter given with reference to this figure.

As illustrated in FIG. 2, with the adjacent conductive layer sections 103 being coupled together by a coupling resistor section 107, when the electric potential of a conductive layer section 103 changes, this change in electric potential is intensively transmitted to the neighborhood, but the propagation of the change to a distant place is attenuated exponentially with respect to a distance.

Therefore, provided that a change in electric potential is detected by using a comparator when a transmission communication element (circuit 105) changes the electric potential of the conductive layer section 103 connected to that communication element, if the threshold of the comparator is appropriately set, a signal is to be transmitted only to a reception communication element (circuit 106) connected to the conductive layer section 103 adjacent to the transmission communication element (circuit 105).

It is understood that the conductive layer sections 103 and the coupling resistor sections 107, observed as a whole, like the ground layer section 101 and the power-source layer section 102 are in a sheet-like shape. This sheet-like structure is hereinafter called "signal layer section", as needed.

Figure 2A:
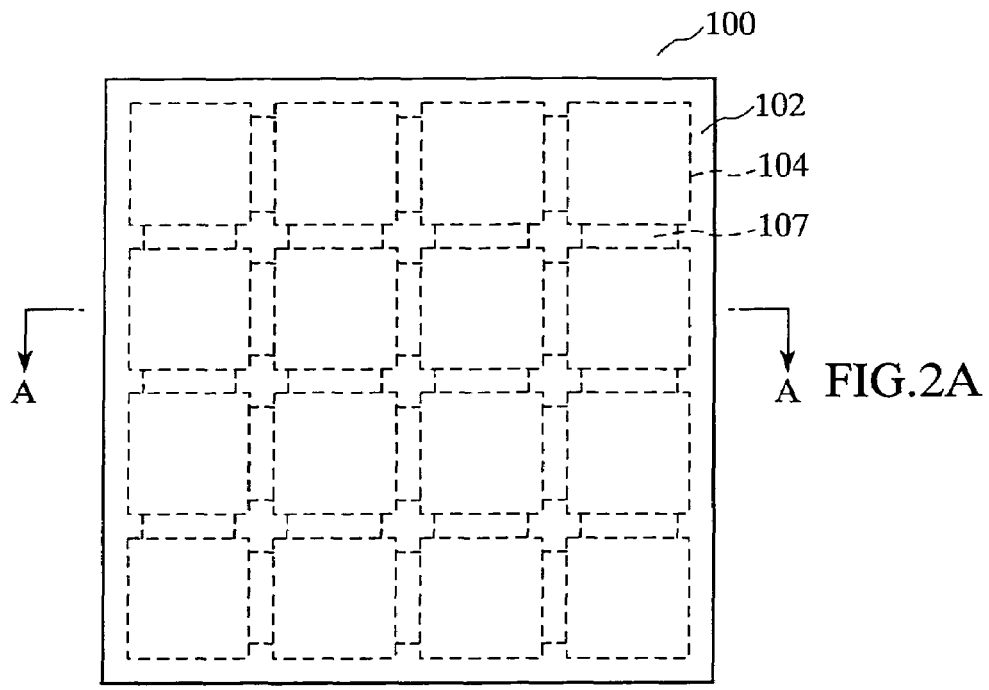
FIG. 2 An explanatory diagram illustrating how individual conductive layer sections are coupled by resistors which are coupling resistors.
Figure 2B:
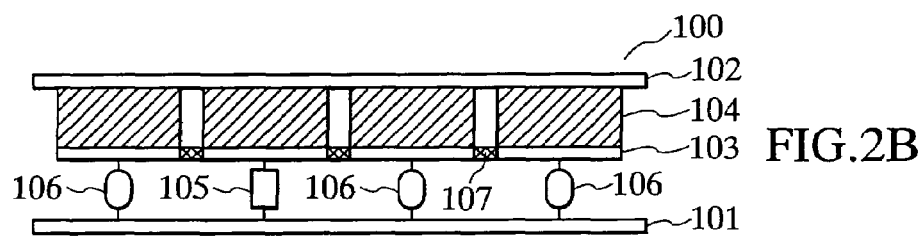
Figure 2C:
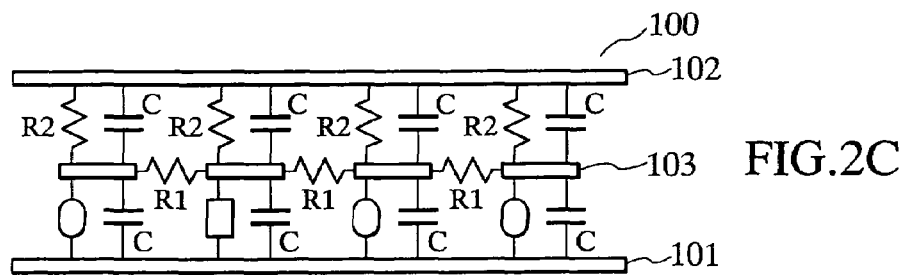
Figure 2D:
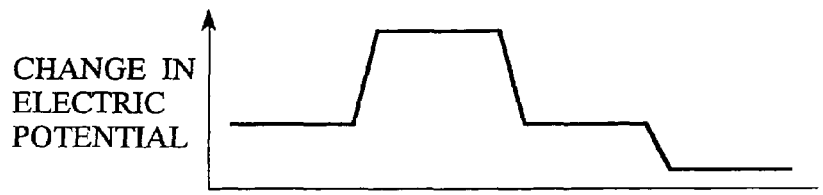

When an equivalent circuit is constituted as illustrated in FIG. 2(c), if the circuit 105 changes the electric potential at a conductive layer section 103, as illustrated in FIG. 2(d), the change in electric potential at the adjacent conductive layer section 103 is to be divided by a resistor, a certain level of a change in electric potential can be detected at the adjacent circuit 106, but the change in electric potential further decreases at a further distant circuit 106. In a case where a signal is transmitted in this manner, it is necessary to change the electric potential based on a frequency.

In this figure, the resistor of the coupling resistor section 107 is R1, the resistor of the pull resistor section 104 is R2, the capacitances of a capacitor between the ground layer section 101 and the conductive layer section 103, and a capacitor between the power-source layer section 102 and the conductive layer section 103 are C, respectively. Provided the impedance of the resistor R2 is so set as to be smaller than the impedance of the capacitance C at a signal frequency band to be used, even if a change in electric potential at a conductive layer section 103 changes at one frequency band, the pattern of that change is divided and transmitted to the adjacent conductive layer section 103.

In contrast in the latter case, a signal is transmitted from a transmission communication element (circuit 105) to a reception communication element (circuit 106) by arranging the transmission circuit 105 for letting a current to flow around the conductive layer section 103 and the reception circuit 106 for detecting electric potentials. In this figure, to facilitate understanding, one communication element (circuit 105) and the plurality of reception communication elements (circuit 106) are illustrated, but typically, for each conductive layer section 103, one transmission communication element (circuit 105) and one reception communication element (106) are disposed, or a communication element which includes both circuits is disposed.

(Boundary-Layout Type)

In the boundary-layout type, adjacent conductive layer sections are coupled together by one communication element to transmit a signal.

Figure 3A:
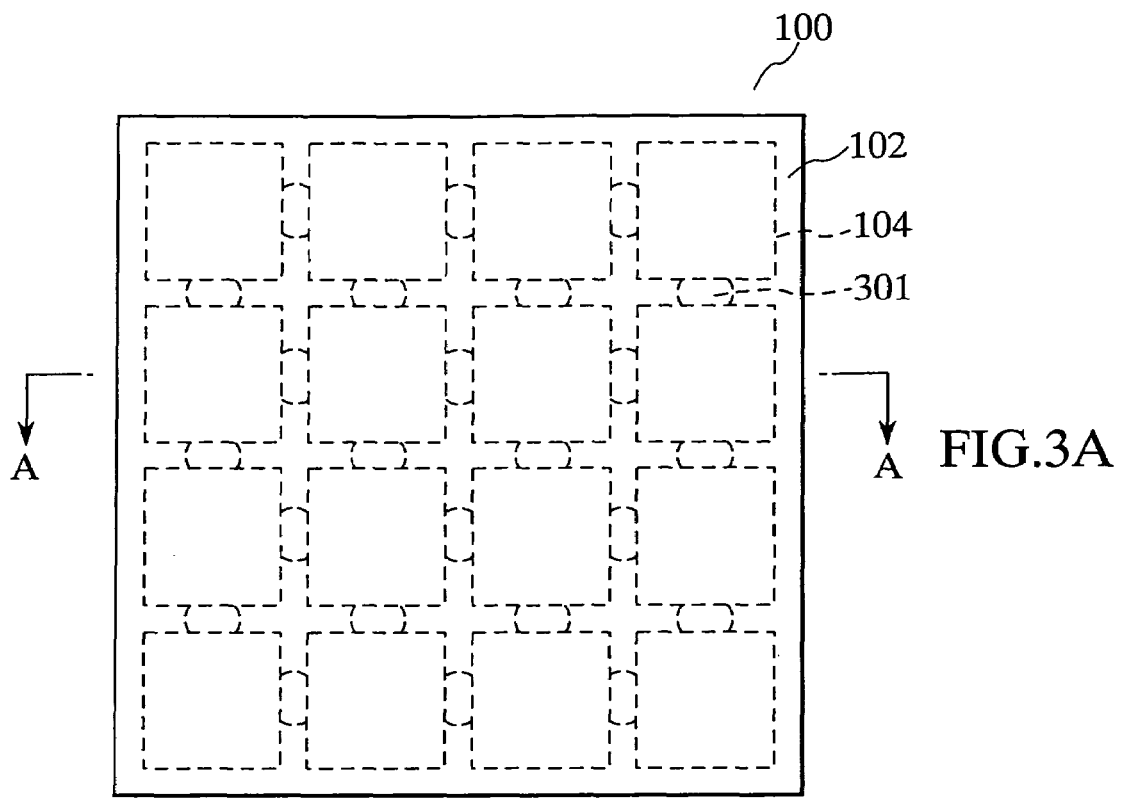
FIG. 3 An explanatory diagram illustrating how individual conductive layer sections are coupled by communication elements.
Figure 3B:
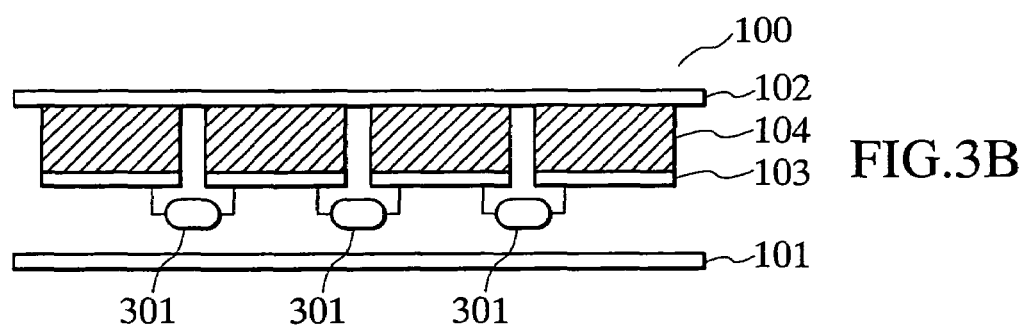
Figure 3C:
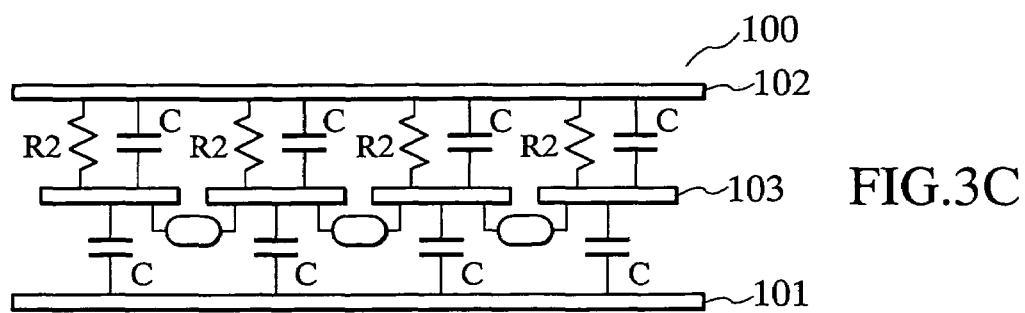

FIG. 3 is an explanatory diagram illustrating how the individual conductive layer sections are coupled together by the communication elements. FIG. 3(a) is a top view FIG. 3(b) is a cross-sectional view, and FIG. 3(c) is an equivalent circuit diagram. An explanation will be hereinafter given with reference to this figure.

Each conductive layer section 103 is provided with communication element sections 301 on the individual sides, respectively, for connection to the adjacent conductive layer sections.

As the electric potential at a conductive layer section 103 is changed by one communication element section 301, other one communication elements 301 which are coupled to the same conductive layer section 103 can detect the change in electric potential. This is the minimum unit of signal transmission, which makes it possible to transmit a signal within an area corresponding to the shape of a square.

The communication element which has detected the change in electric potential and received the signal further transmits the signal to the adjacent conductive layer section 103 coupled by that communication element, if necessary. That is, the signal is transmitted farther by changing the electric potentials of the adjacent conductive layer sections 103.

To facilitate understanding, the connection between the communication element section 301 and the ground layer section 101 is omitted in this figure. Because the communication element sections 301 have only to change the electric potentials of the conductive layer sections 103 and detect the electric potential changes, as mentioned above, the most general mode is that the communication elements change the electric potentials by, for example, letting a current to flow between the communication element sections 301 and the ground layer section 101, as per the central-layout type.

Two embodiments of the invention can be thought from the basic structure as described above. Those structures will be hereinafter explained in more detail.

FIRST EMBODIMENT

This embodiment corresponds to the central-layout type, and is a communication unit according to a structure which couples the conductive layer sections 103 together by the coupling resistor section 107 and makes use of the attenuation of propagation of an electric potential change in accordance with the distance, to transmit information to the neighborhood.

Figure 4A:
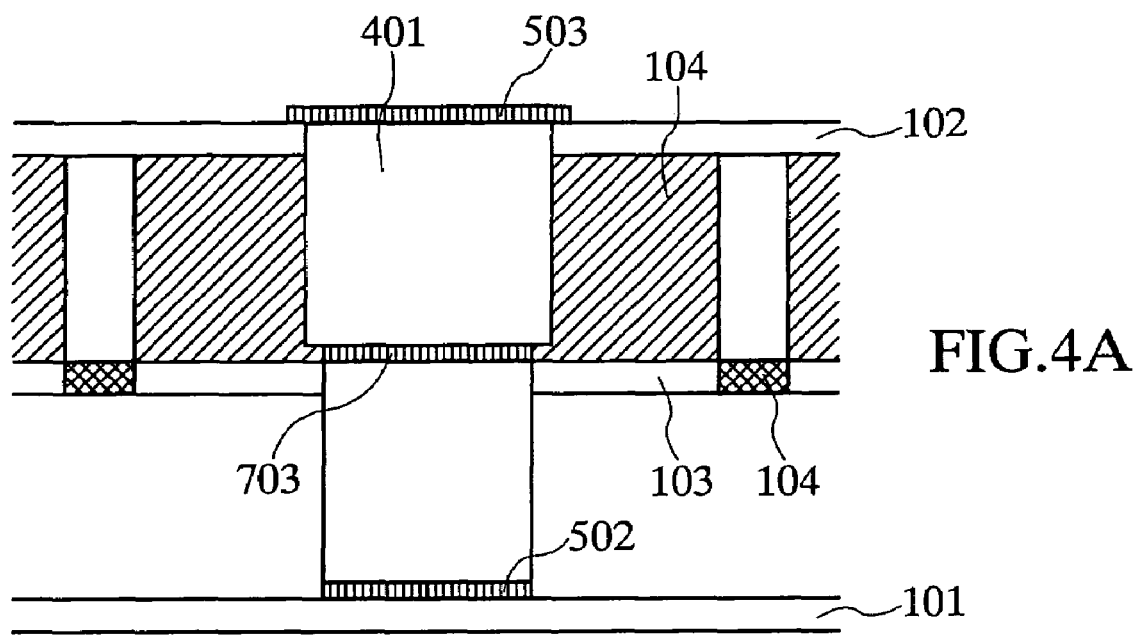
FIG. 4 An explanatory diagram illustrating how a part of a central-layout type communication unit is.
Figure 4B:
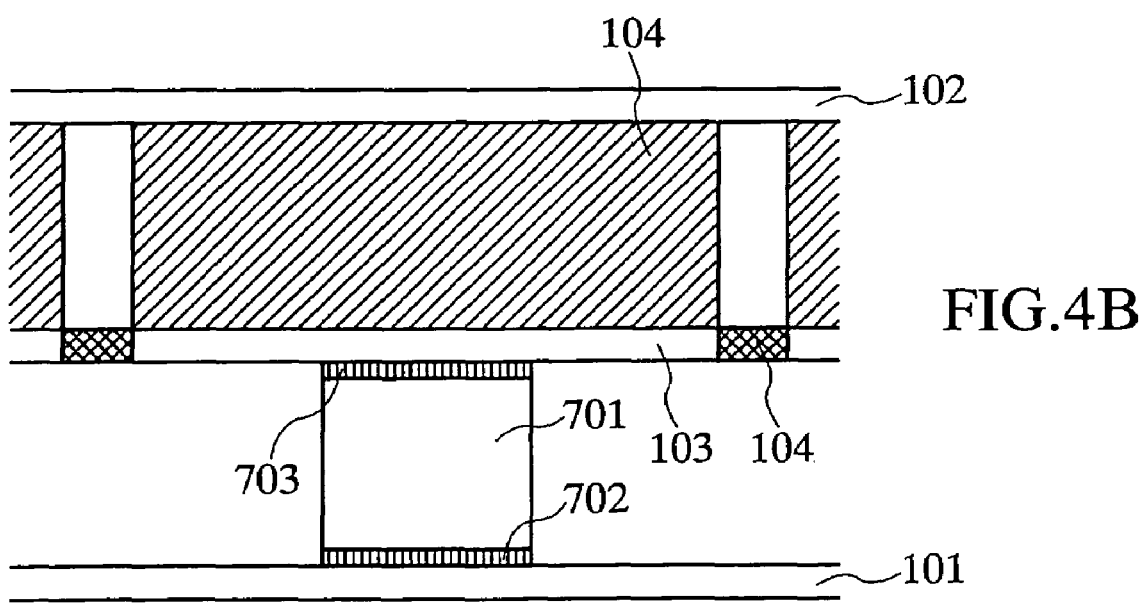

FIG. 4 is an explanatory diagram illustrating how a part of the central-layout type communication unit is. FIG. 4(a) is a cross-sectional view of that unit according to an embodiment of a three-layer-contact type, and FIG. 4(b) is a cross-sectional view of that unit according to an embodiment of a two-layer-contact type. Their explanations will be hereinafter given in order.

(Three-Layer-Contact Type)

In the embodiment of the three-layer-contact-type, a communication element 401 includes the ground layer section 101, the power-source layer section 102, the conductive layer section 103, and contacts, and is so laid out as to penetrate the center of each conductive layer section 103.

Figure 5:
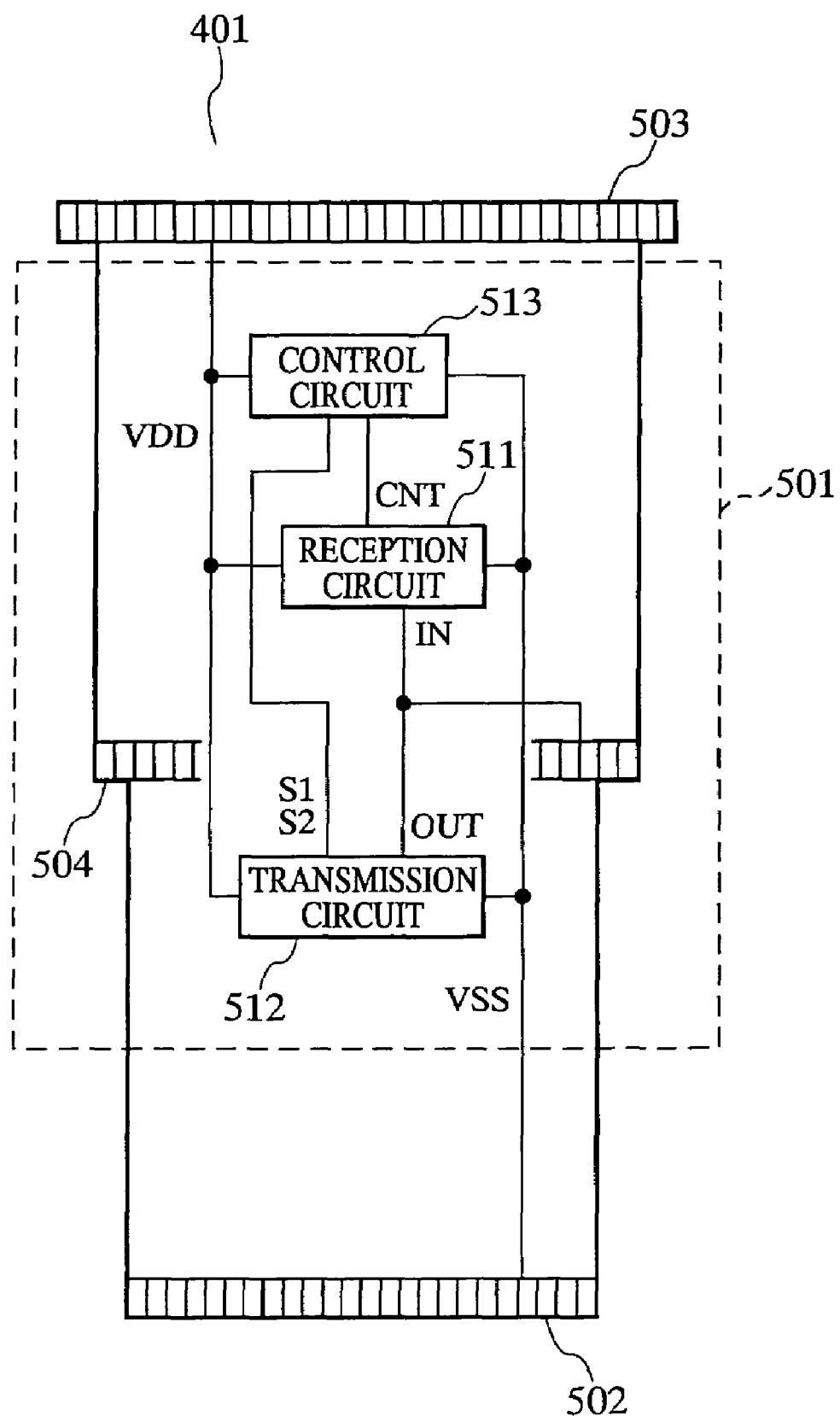
FIG. 5 An exemplarily diagram illustrating a schematic structure of a three-layer-contact type communication element FIG. 6 An explanatory diagram illustrating typical circuit structures of a reception circuit and a transmission circuit FIG. 7 An exemplarily diagram illustrating a schematic structure of a two-layer-contact type communication element.

FIG. 5 is an exemplarily diagram illustrating the schematic structure of such a three-layer-contact type communication element 401. An explanation will be hereinafter given with reference to this figure.

The communication element 401 includes a communication circuit 501, a contact 502 to the ground layer section 101, a contact 503 to the power-source layer section 102, and a contact 504 to the conductive layer section 103. The communication circuit 501 has a reception circuit 511, a transmission circuit 512, and a control circuit 513.

The reception circuit 511, the transmission circuit 512, and the control circuit 513 are operated with a potential difference between the ground layer section 101 and the power-source layer section 102 as power.

Various information processing apparatuses such as a more general logical circuit, and a further advanced small computer can be considered as the control circuit 513. The control circuit 513 controls the reception circuit 511 and the transmission circuit 512 to communicate with the adjacent communication element 401, and constitutes a network. Regarding the control method for such communication, the technology disclosed in the above-described "Patent Literature 1" can be applied.

Figure 6:
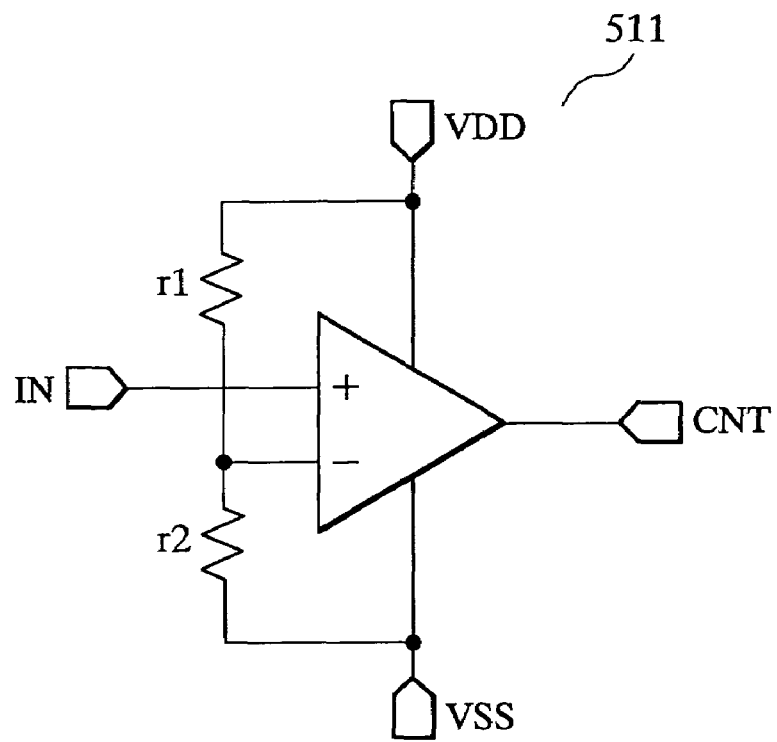
Figure 6:
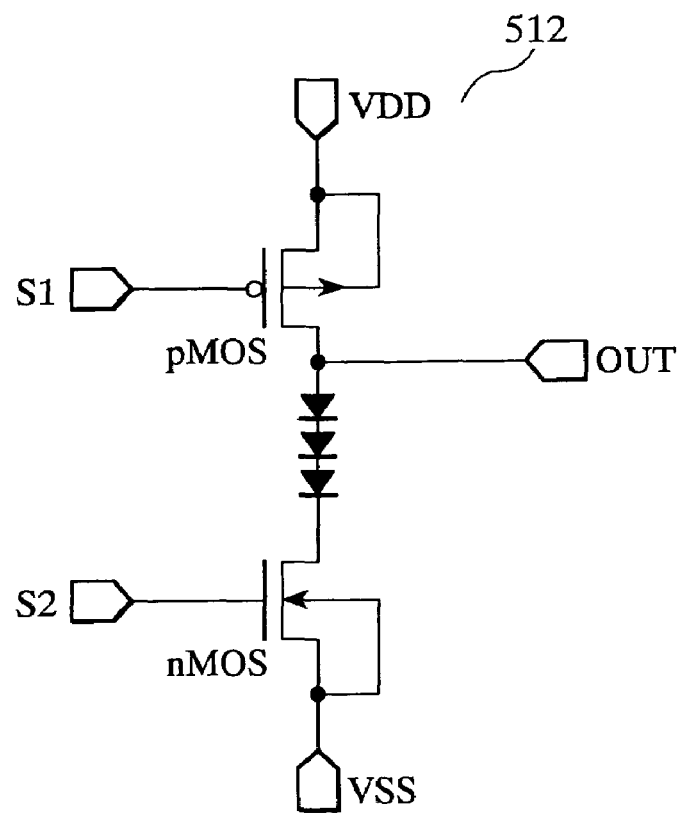

FIG. 6 is an explanatory diagram illustrating typical circuit structures of the reception circuit 511 and the transmission circuit 512. The reception circuit 511 classifies electric potentials into two levels of an H level and an L level by means of a comparator, according to which an electric potential change is detected. The threshold of the electric potential is set by the ratio of potential division by resistors r1 and r2 of the reception circuit As mentioned above, the threshold is so set as to enable detection of a change in electric potential when the adjacent communication elements 401 change the electric potential, and as not to permit the change to exceed the threshold when a communication element 401 located farther than the adjacent ones.

The combined resistance of the resistors r1 and r2, and the input impedances of the comparator are so set as to be sufficiently larger than the impedance R2 of the pull resistor section 104, and as not to cause the presence of the reception circuit to affect a signal voltage.

In contrast, an output OUT of the reception circuit 512 can be three states of an H level, an L level, and a high impedance. The transmission circuit 512 receives a control signal from the control circuit 513 at terminals S1 and S2. In this reception circuit 512, as S1 and S2 are simultaneously set to H, an L-level signal is output from OUT, and as SI and S2 are simultaneously set to L, an H-level signal is output from OUT. As S1 is set at H and S2 is set to L, it becomes a high impedance.

The communication element 401 outputs an L level or an H level from OUT when transmitting a signal by itself. In other cases, the transmission circuit 512 is set to a high impedance state, so that the reception circuit 511 receives a signal.

In the transmission circuit 512, diodes put between an nMOS and a pMOS are for adjusting the amplitude of an output voltage. If all diodes are removed and the pMOS and the nMOS are short-circuited, the H level of OUT becomes the electric potential (predetermined reference electric potential) of the power-source layer section 102, and the L level of OUT becomes the electric potential of the ground layer section 101. Insertion of the diodes increases the electric potential of the L level by the forward voltage drop of the diodes.

In the three-layer-contact type, the pull resistor section 104 may be mounted in the communication element section 301.

In the communication element section 301, the conductive layer sections 103 may be connected to both the power-source layer section 102 and the ground layer section 101 by resistors, and the conductive layer sections 102 may be held at a voltage dividing point by those resistors at a normal time when no signal is generated.

(Two-Layer-Contact Type)

A two-layer-contact type communication element 701 is so laid out as to have the ground layer section 101, the conductive layer section 103, and contacts. Although the communication element 401 of the two-layer-contact type uses the potential difference between the ground layer section 101 and the power-source layer section 102 as a supply voltage, the communication element 701 of the two-layer-contact type uses a potential difference between the ground layer section 101 and the conductive layer section 103 as a supply voltage.

Figure 7:
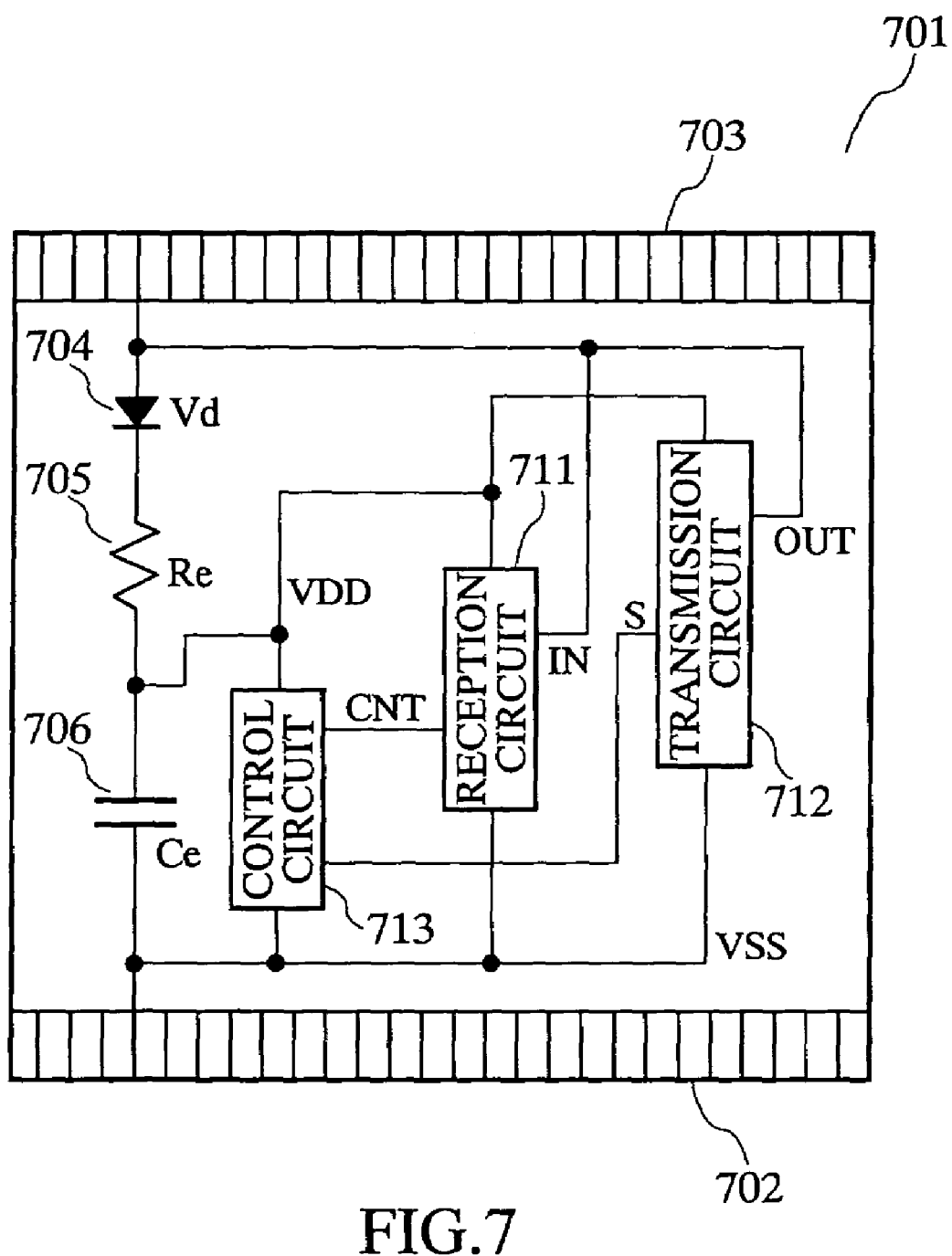

FIG. 7 is an exemplarily diagram illustrating the schematic structure of the two-layer-contact type communication element. An explanation will be hereinafter given of this figure.

The communication element 701 comprises a contact 702 to the ground layer section 101, a contact 703 to the conductive layer section 103, a diode 704, a resistor 705, a capacitor 706, a reception circuit 712, a transmission circuit 712, and a control circuit 713.

A voltage for operating the reception circuit 711, the transmission circuit 712, and the control circuit 713 is a potential difference between the contact 702 to the ground layer section 101 and the contact 703 to the conductive layer section 103.

A charge is stored in the capacitor 706 from the contact 703 through the diode 704 and the resistor 705, and becomes the power source for operating the reception circuit 711, the transmission circuit 712, and the control circuit 713. Hereinafter, let the resistance of the resistor 705 be Re, the capacitance of the capacitor be Ce, and the forward voltage drop of the diode 704 beVd.

A packet transfer frequency is adjusted in such a way that the sum TL of the time during which the communication element 701 is transmitting a signal electric potential of L level becomes less than 1/n times the total communication time T0, that is, TL<T0/n, and the average current consumption of the circuit at this time is expressed as I. The time constant CeRe is so set as to be sufficiently large, and Re is so set as to be sufficiently larger than a load impedance (in this embodiment, R2 in the equivalent circuit) at the time of transmitting a signal to the conductive layer section 103. Under such settings, a voltage V between both ends of the capacitor 706 becomes V=Ve−Vd−IR, with respect to the reference electric potential Ve. Accordingly, the reception circuit 711, the transmission circuit 712, and the control circuit 713 have only to be so structured as to be operated with the voltage V.

Various information processing apparatuses such as a more general logical circuit, and a further advanced small computer can be considered as the control circuit 713. The control circuit 713 controls the reception circuit 711 and the transmission circuit 712 to communicate with the adjacent communication elements 701, and constitutes a network. Regarding the control method for such communication, the technology disclosed in the above-described "Patent Literature 1" can be applied.

Figure 8:
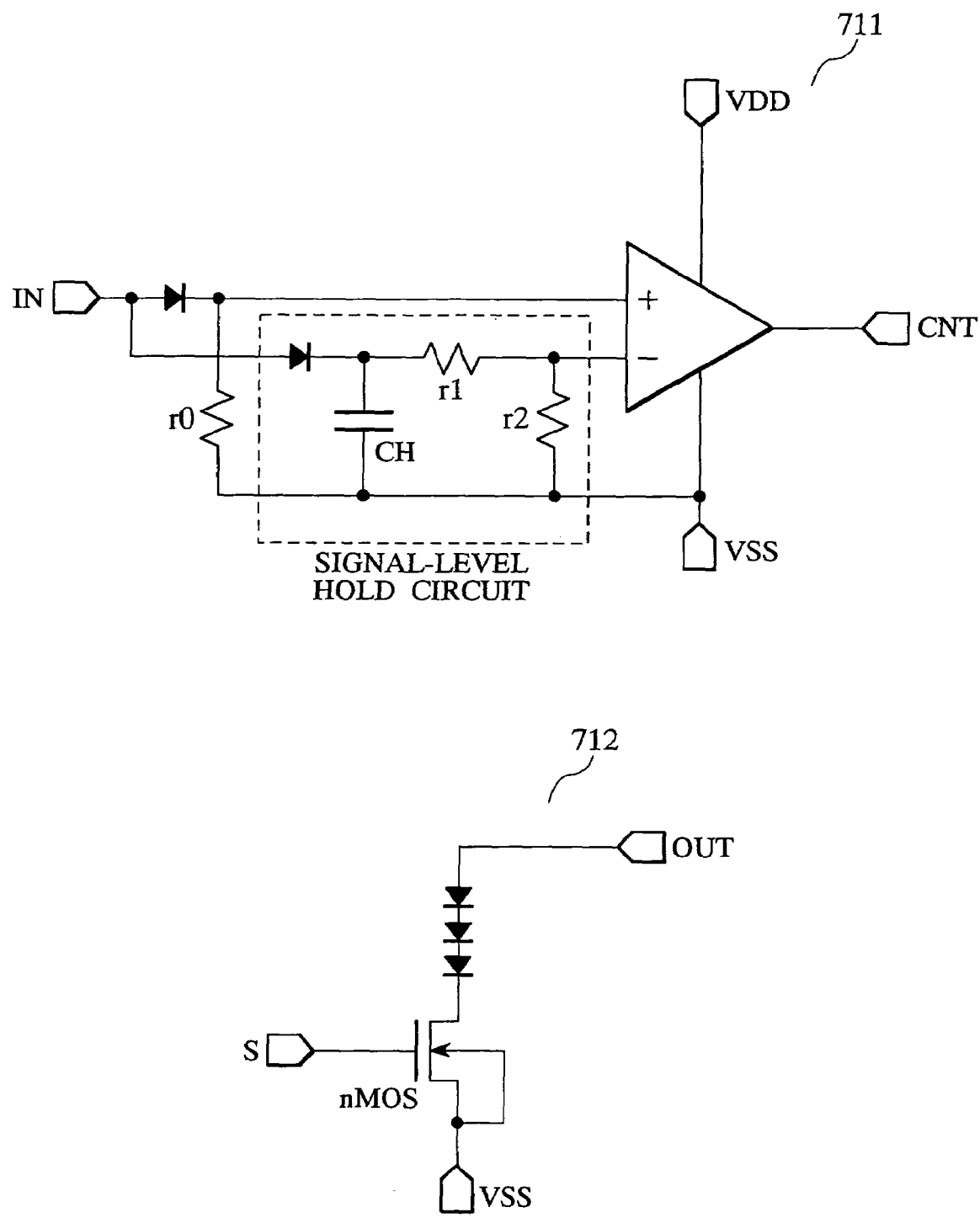
FIG. 8 An explanatory diagram illustrating typical circuit structures of a reception circuit and a transmission circuit FIG. 9 An explanatory diagram illustrating how a signal layer section has a coupling resistor section filling between conductive layer sections in a sheet-like manner.

FIG. 8 is an explanatory diagram illustrating typical circuit structures of the reception circuit 711 and the transmission circuit 712. An explanation will be hereinafter given with reference to this figure.

An input S of the transmission circuit 712 is connected to the control circuit 713, and an output OUT is connected to the contact 703 with the conductive layer section 103. The difference from the transmission circuit 512 is that the pMOS is removed for the source voltage supplied to the transmission circuit may become lower than the electric potential of the conductive layer section 103.

Because it is structured by using the nMOS instead of using pMOS in this manner, no current is supplied from the transmission circuit 712 to the conductive layer section 103 at the rise of a signal. Therefore, the condition under which the conductive layer section 103 is correctly pulled is that the resistor R2 of the equivalent circuit is so set as to be smaller than the impedance of its parallel capacitor.

In the reception circuit 711, a circuit (surrounded by the dotted line in the figure) which compensates the voltage difference between V and Ve is inserted in the preceding stage. If the time constant of CH and r1+r2 in a signal-H-level-hold circuit is secured sufficiently larger than the continuous time of the L level of a signal, an H-level signal can be held at the terminal of CH.

Moreover, if the resistors in the figures are so set as to have a relationship like r0=r1+r2, a terminal voltage of r0 and a terminal voltage of CH can become equal to each other when the signal is at the H level.

Because the threshold can be set by the proportion of r1 and r2, a slight voltage drop (change in electric potential) at the conductive layer section 103 is stably detectable.

(Modification of the Signal Layer Section or the Like)

In the above-described embodiment, individual conductive layer sections 103 are independent conductive materials, and are coupled by the coupling resistor section 107, and there is a space in the signal layer section. This space may be filled by an appropriate electric insulator, or may be left as it is.

Herewith, the signal layer section is also a sheet-like material, according to a further advancement of which the coupling resistor section 107 may be filled between the conductive layer sections 103 in a sheet-like manner. FIG. 9 is an explanatory diagram illustrating how a signal layer section has the coupling resistor section 107 filling between the conductive layer sections 103 in a sheet-like manner.

Figure 9A:
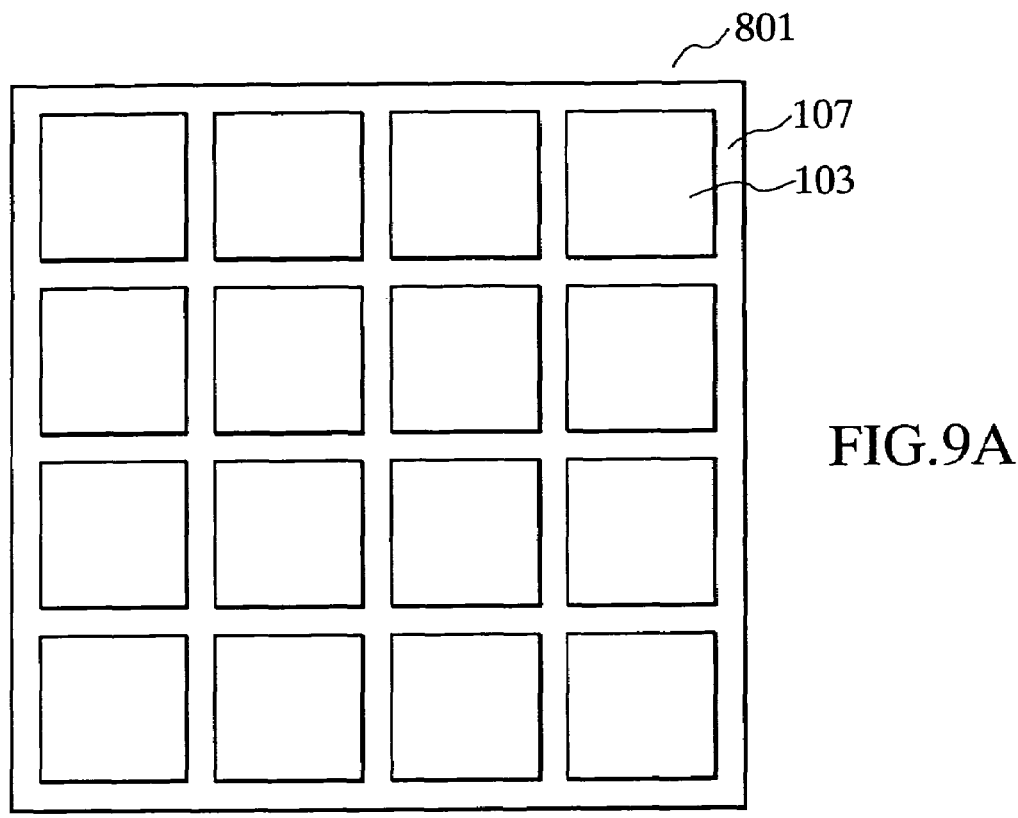

As illustrated in FIG. 9(a), a signal layer section 801 comprises a plurality of conductive layer sections 103 and one coupling resistor section 107 which has the same thickness as those of the conductive layer sections, and is structured by making holes in the sheet-like coupling resistor section 107, and embedding the conductive layer sections 103 in those holes. Even with such a structure employed, the propagation of an electric potential charge is rapidly attenuated at a distant place, so that a signal can be transmitted as per the above-described embodiment.

Figure 9B:
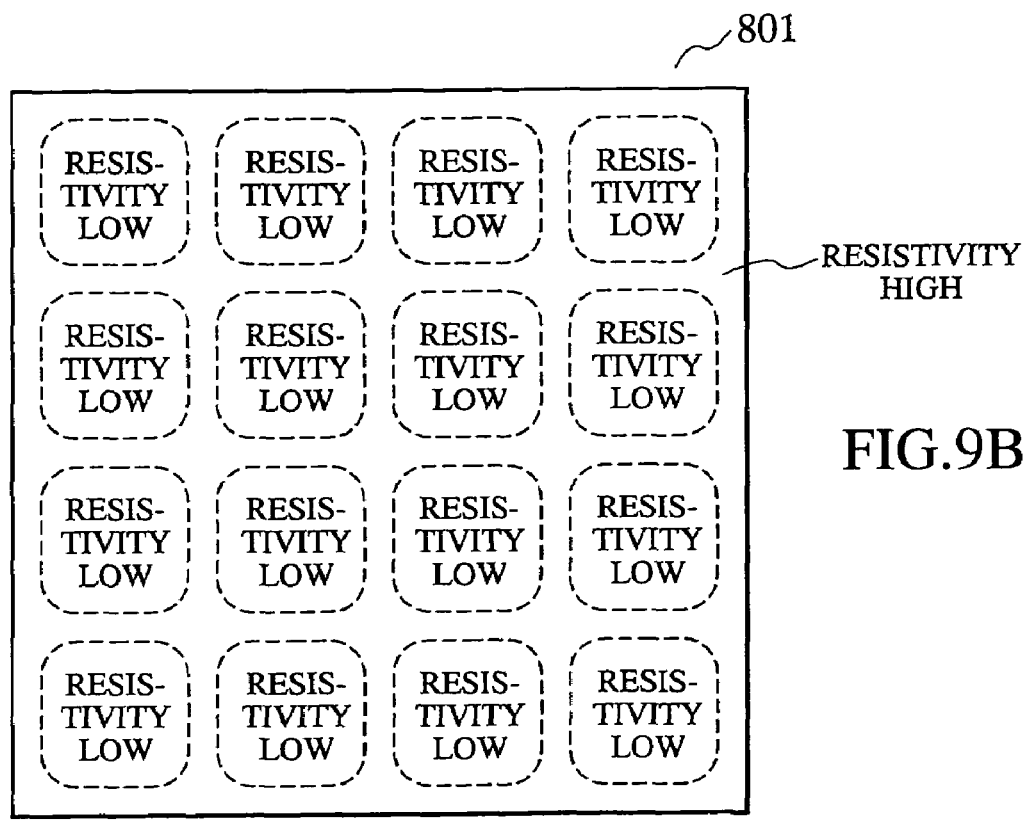

As illustrated in FIG. 9(b), a piece of sheet-like member whose resistivity differs locally, and continuously or discontinuously changes may be used as the signal layer section 801. In this case, if the average resistivity of an area corresponding to the conductive layer section 103 is set extremely low, and the average resistivity of an area corresponding to the coupling resistor section 107 is set high, it is possible to achieve the same function as the signal layer section 801 illustrated in FIG. 9(a).

SECOND EMBODIMENT

Figure 10A:
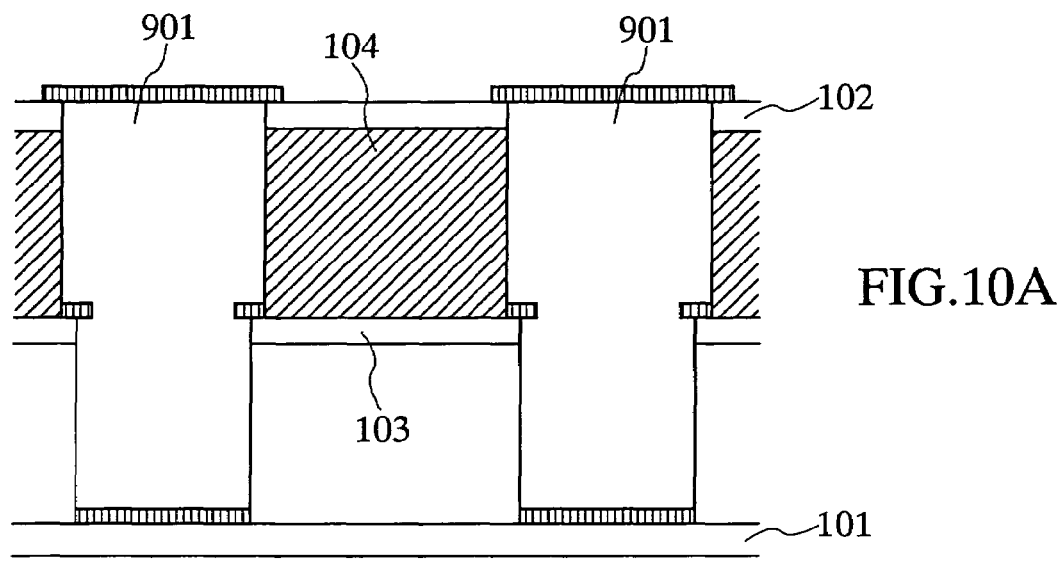
FIG. 10 An explanatory diagram of a boundary-layout type communication unit.
Figure 10B:
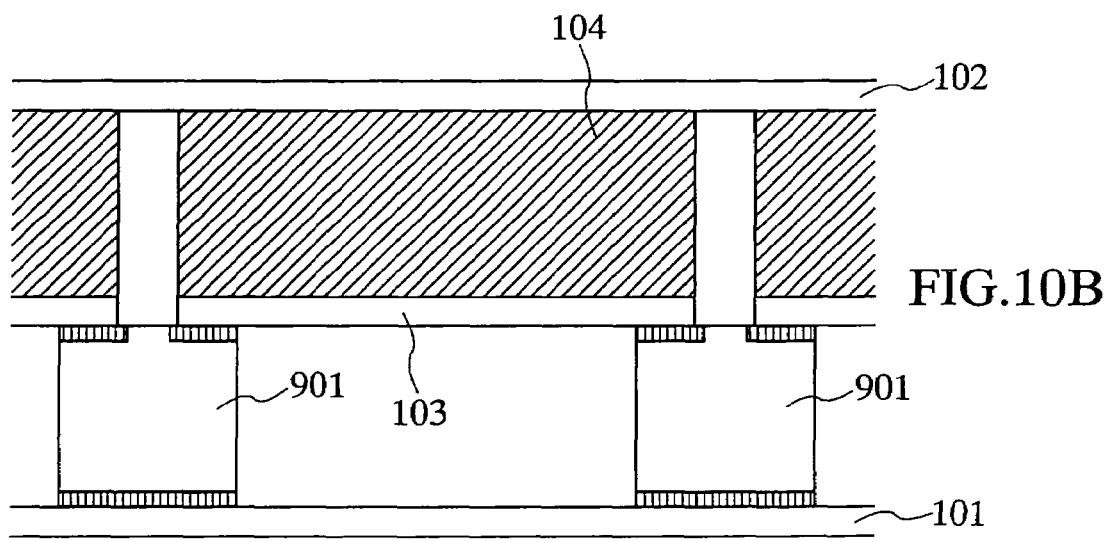
Figure 11:
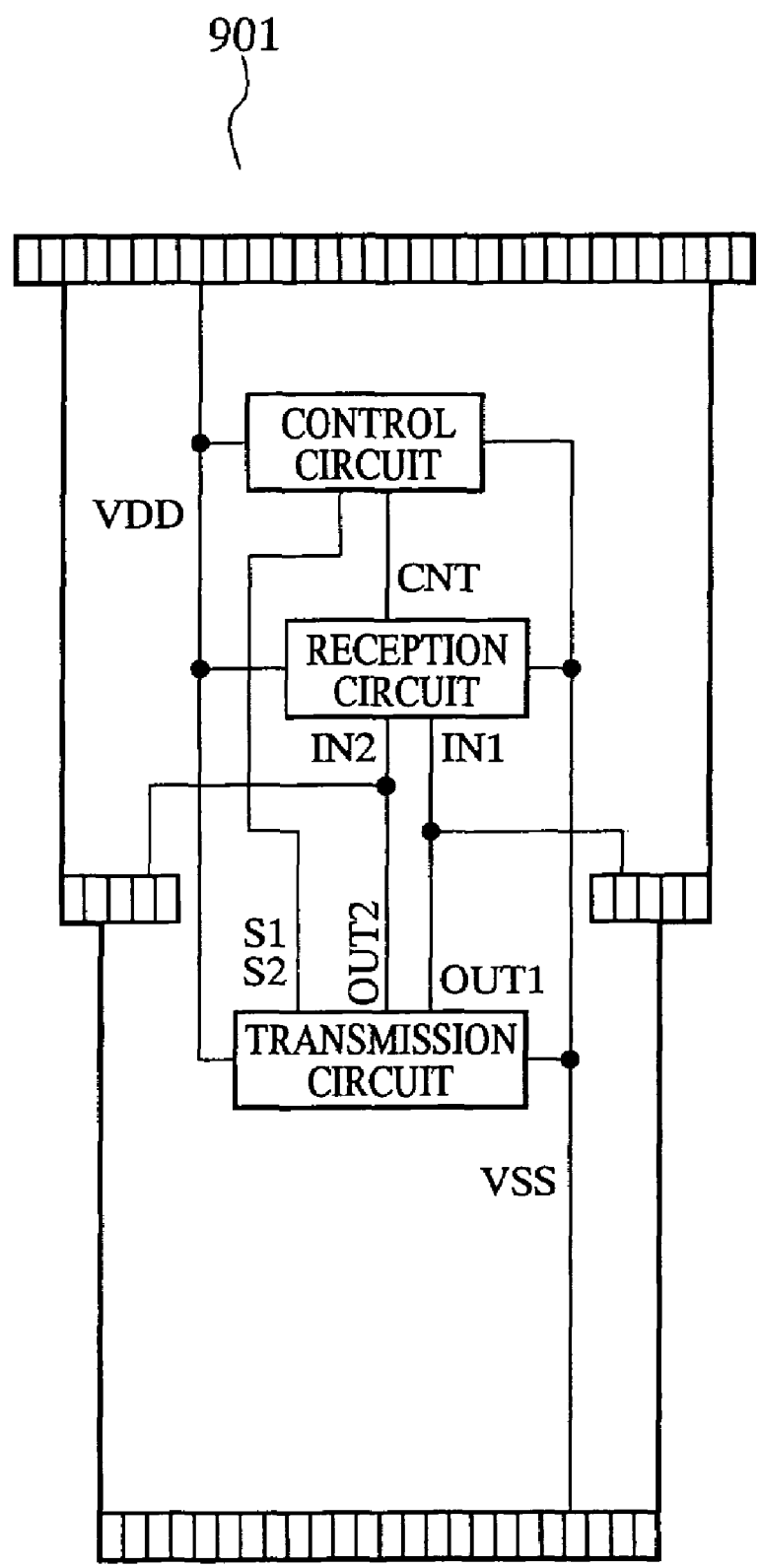
FIG. 11 An explanatory diagram of a boundary-layout type and three-layer-contact type communication element FIG. 12 An explanatory diagram of a boundary-layout type and two-layer-contact type communication element FIG. 13 An explanatory diagram illustrating how a power-source layer section, a ground layer section, and a conductive layer section are patterned.
Figure 12:
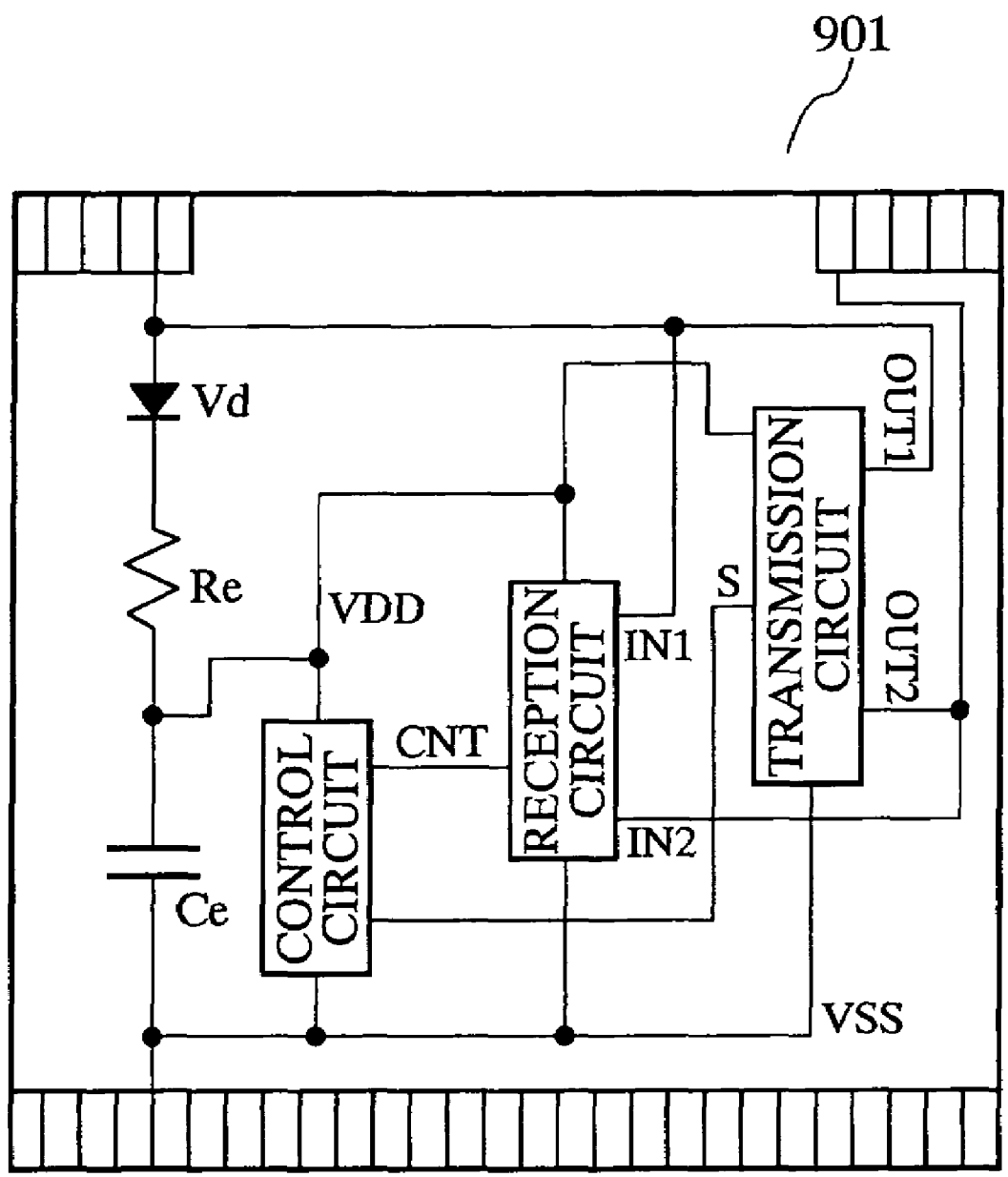

This embodiment corresponds to a boundary-layout type. FIG. 10 and FIG. 11 are explanatory diagrams illustrating how a part of such a communication unit is. FIG. 10(a) is a cross-sectional view according to an embodiment of the three-layer-contact type, and FIG. 10(b) is a cross-sectional view according to an embodiment of the two-layer-contact type. FIG. 11 is an explanatory diagram of the structure of a communication unit according to the embodiment of the three-layer-contact type. FIG. 12 is an explanatory diagram of the structure of a communication unit according to the embodiment of the two-layer-contact type.

In the boundary-layout type, a communication element 901 is so arranged as to lie over the adjacent sides of the two conductive layer sections 103. In the central-layout type, the connection between the communication element 401 and the conductive layer section 103 is made by one common terminal, whereas in the boundary-layout type, the connection between the communication element 901 and the conductive layer section 103 is made by two terminals.

In FIG. 11 and FIG. 12, to facilitate understanding, the outputs OUT 1 and OUT 2 of two transmission circuits are collectively illustrated as one output from one transmission circuit, and the inputs IN 1 and IN 2 of two reception circuits are collectively illustrated as one input to one reception circuit They may be structured by just parallel connections. In this case, the same communication element as that of the central-layout type can be used for the boundary-layout type.

An embodiment such that a pair of a transmission circuit and a reception circuit are prepared on the OUT 1/IN 1 side, and another pair of transmission circuit and a reception circuit are prepared on the OUT 2/IN 2 side may be adapted. In this case, a control device controls the two transmission circuits and the two reception circuits.

In each communication unit 901, when the reception circuit have detected the transmission of a signal from a change in the electric potential of one of the conductive layer section 103, the control circuit determines whether or not it is necessary to transmit the signal to the other one of the conductive layer sections 103, and, when transmission is necessary, the transmission circuit changes the electric potential of the other one of the conductive layer sections 103 to transmit the signal.

In the case of the two-layer-contact type, and the individual circuits are driven upon reception of an electric charge supplied from only either one of the two conductive layer sections 103.

Accordingly, provided that communication elements laid out at two sides of four sides of the square in each conductive layer section 103 are supplied with electric charges, it is desirable that the loads of the electric-charge supplies of the individual conductive layer sections 103 should be averaged.

In the case of the two-layer-contact type, there is space between the conductive layer sections 103, and in the case of the three-layer-contact type, there is space in the other portion of the space between the conductive layer sections 103 than the portion where the communication element 901 penetrates. The space may be filled by an electric insulator, and the conductive layer sections 103 and the remaining portions may be constituted by a sheet-like member whose resistivity changes locally as illustrated in FIG. 9(*a*), (*b*).

THIRD EMBODIMENT

In both of the above-described examples, while the ground layer section 101 and the power-source layer section 102 are assumed to be a homogeneous sheet-like type, they may be one patterned to a certain degree (for example, conductors patterned like meshes).

Figure 13:
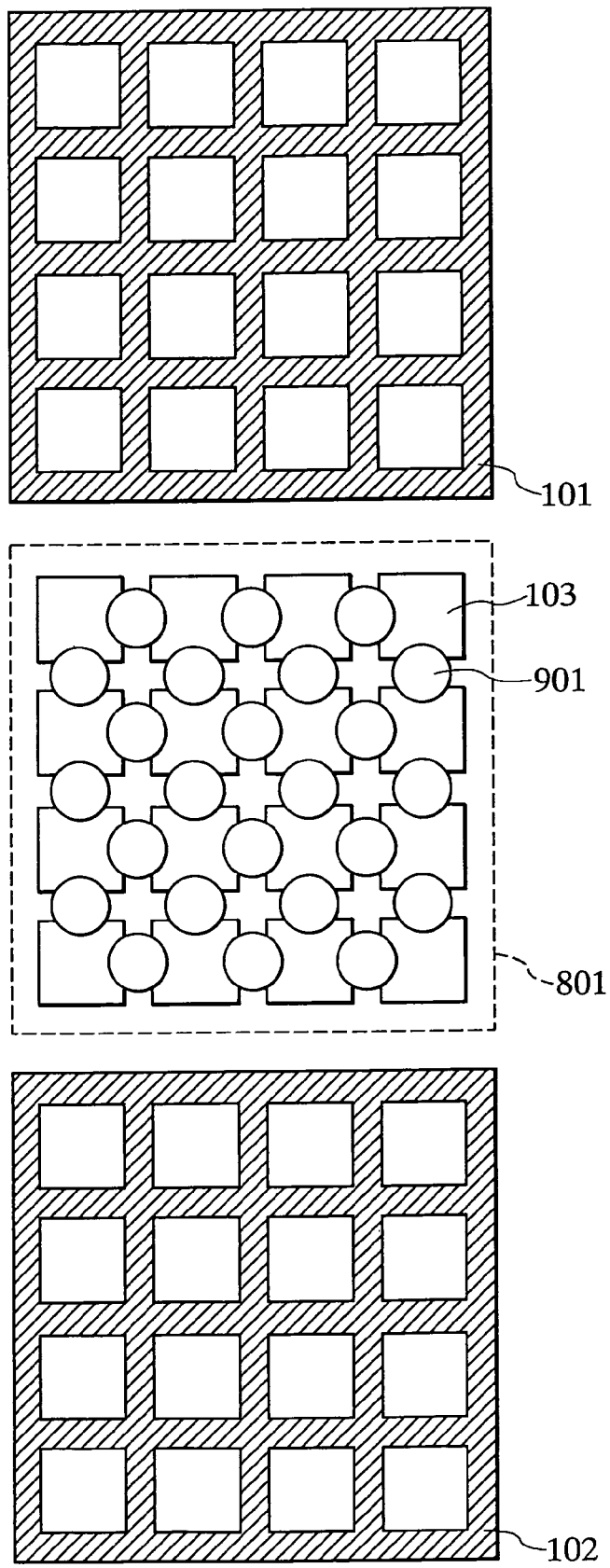
Figure 14A:
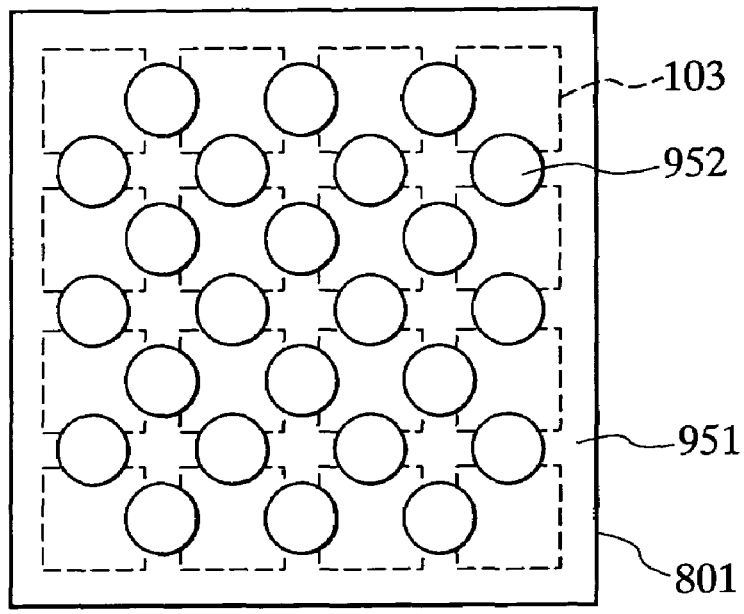
FIG. 14 An explanatory diagram explaining another embodiment of a signal layer section.
Figure 14B:
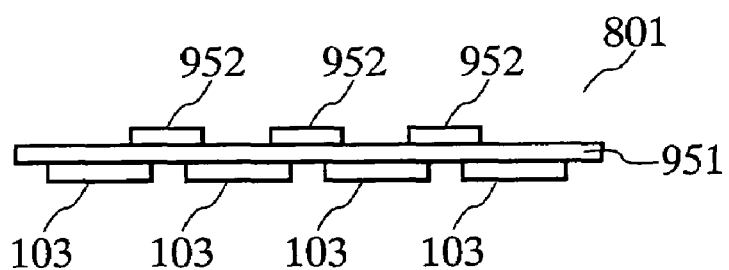
Figure 14C:
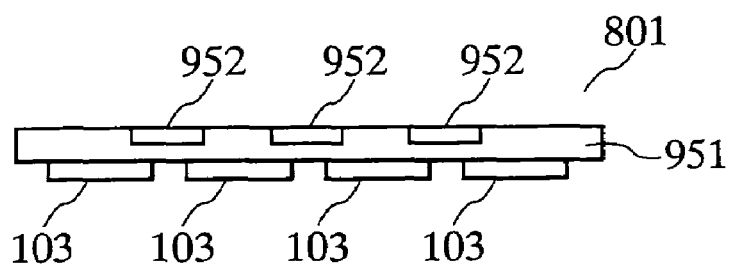
Figure 14D:
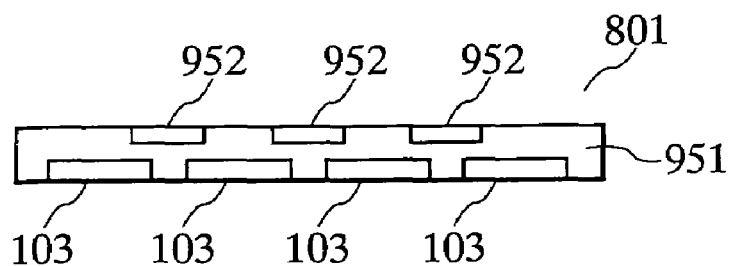

For example, the good conductors of the ground layer section 101 and power-source layer section 102 may be laid out in such areas where they do not overlap the individual conductive layer sections 103. In this case, the good conductors of the ground layer section 101 and power-source layer section 102 are in a meshe-like pattern, and the conductive layer sections 103 are located so as to overlap the spaces of the meshes. FIG. 13 is an explanatory diagram illustrating how such a pattern is. Regarding the ground layer section 101 and the power-source layer section 102 in the figure, the hatched portions are the portions where good conductors are present This figure illustrates a case of the boundary-layout type, but the central-layout type can employ a similar pattern.

FOURTH EMBODIMENT

This embodiment proposes a scheme of another structure of the signal layer section 801.

FIG. 14 is an explanatory diagram explaining another embodiment of the signal layer section. FIG. 14(*a*) is a top view of the signal layer section 801, and FIG. 14(*b*), (*c*) and (*d*) are cross-sectional views of three embodiments of the signal layer section 801.

As illustrated in this figure, in the sheet-like signal layer section 801, a plurality of conductive layer sections 103 are in close contact with a single sheet-like resistor 951, and a good conductor 952 is so arranged as to lay over the conductive layer sections 103 with the resistor 951 in between.

This can allow the sheet-like resistor 951 to function as the pull resistor section 104, and the good conductor 952 decreases the coupling resistance of the adjacent conductive layer sections 103.

In (*c*) and (*d*) of the same figure, the good conductors 952 and the conductive layer sections 103 are so laid out as to be caved in the resistor 951, and the entire shape of the signal layer section 801 is patterned like a single flat sheet. This structure facilitates handling, and makes the construction easier by using a technique like etching.

FIFTH EMBODIMENT

Figure 15A:
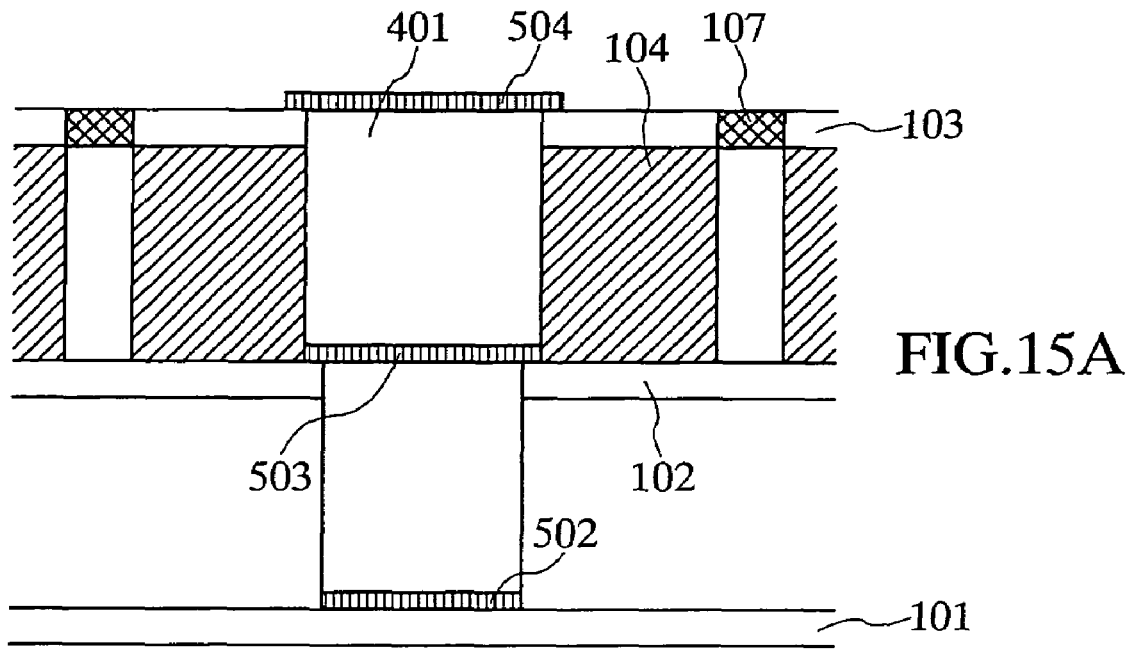
FIG. 15 An explanatory diagram explaining an embodiment of a central-layout type communication unit which interchanges the order of a power-source layer section and a conductive layer section.
Figure 15B:
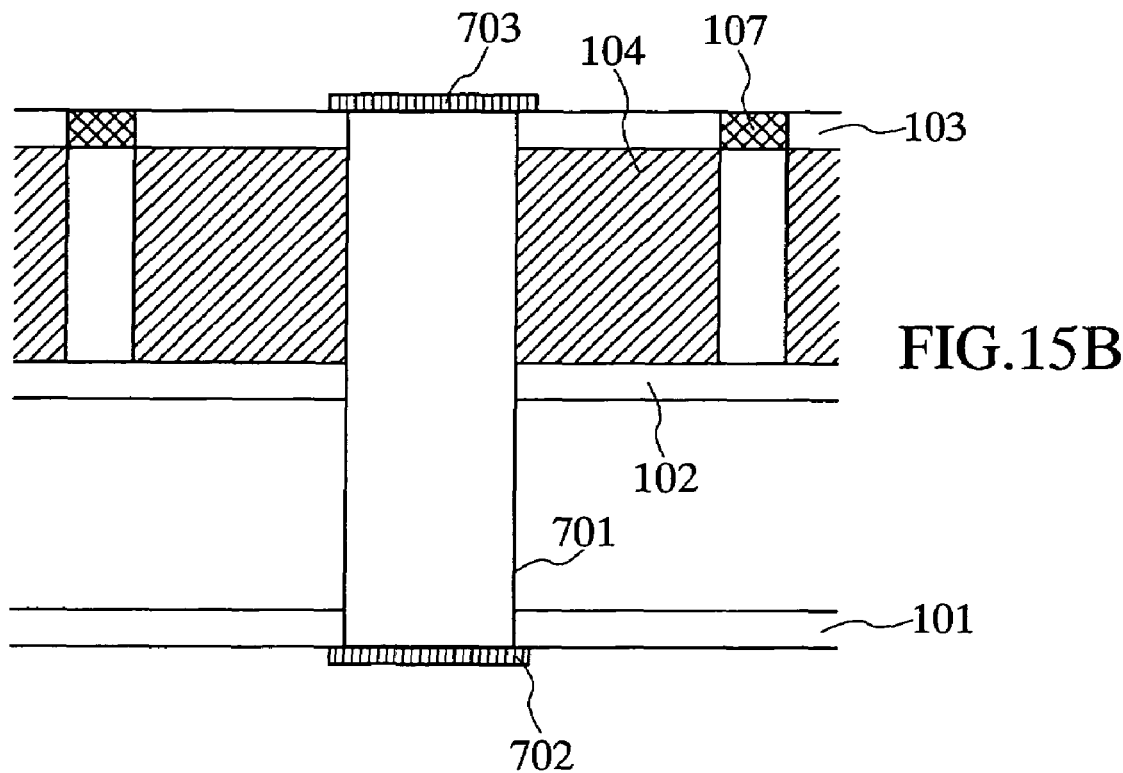
Figure 16A:
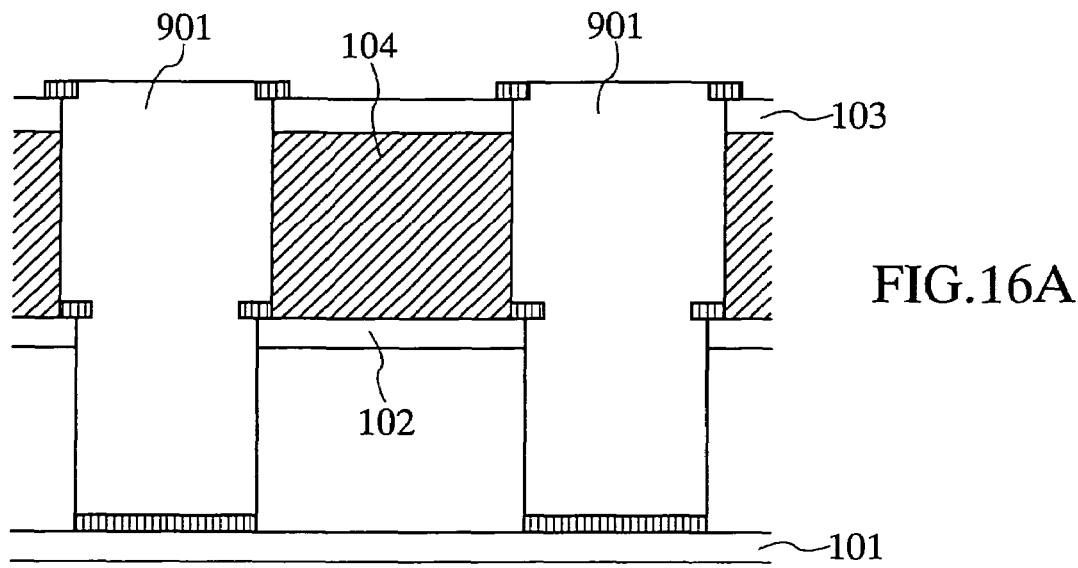
FIG. 16 An explanatory diagram explaining an embodiment of a boundary-layout type communication unit which interchanges the order of a power-source layer section and a conductive layer section.
Figure 16B:
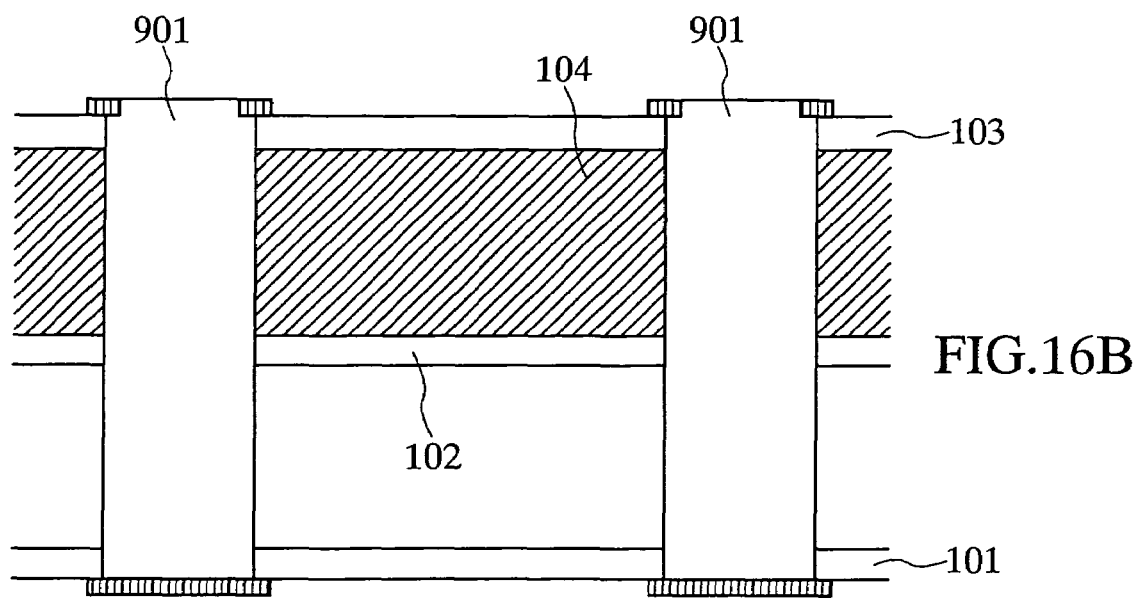

In the above embodiment, the conductive layer section 103 is sandwiched between the ground layer section 101 and the power-source layer section 102, but this order may be changed That is, this is an embodiment where the power-source layer section 102 is sandwiched between the ground layer section 101 and the conductive layer section 103. FIG. 15 and FIG. 16 are explanatory diagrams of such an embodiment.

When the order of the power-source layer section 102 and the conductive layer section 103 is changed, the capacitances of capacitors in an equivalent circuit change, but there are no substantive changes in the other structures and the operation principles. Accordingly, a structure similar to those of the above-described embodiments can be employed.

In addition, although the above-described embodiments are structure in such a way that the conductive layer sections 103 (signal layer sections) is sandwiched between the ground layer section 101 and the power-source layer section 102, an embodiment where the power-source layer section 102 is sandwiched between the conductive layer sections 103 and the ground layer section 101, or an embodiment where the ground layer section 101 is sandwiched between the conductive layer sections 103 and the power-source layer section 102 may be employed.

SIXTH EMBODIMENT

Figure 17:
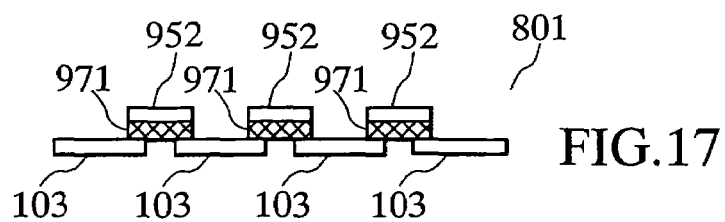
FIG. 17 An explanatory diagram explaining an embodiment of a communication unit which uses a coupling body comprising a resistor and a capacitor or a coupling body comprising a capacitor, instead of a coupling resistor section.

This embodiment uses a coupling body which has a pure resistor and a capacitor connected in parallel, or a coupling body which uses a capacitor in place of the coupling resistor section 107. FIG. 17 illustrates how it is.

As illustrated in FIG. 17, the conductive layer sections 103 are coupled together by good conductors 952 and coupling bodies 971.

In a case where an insulator is used as the coupling body 971, the "coupling body which uses only a capacitor" couples the conductive layer sections 103. In a case where one having a certain resistance is used as the coupling body 971, the "coupling body which has a capacitor and a resistor connected in parallel" couples the conductive layer sections 103.

Particularly, in the latter case, if the time constant C'R' of the capacitance C' of the capacitor and a resistance R''' is so set as to be equal to "the time constant (C1+C2)R2 of the combined capacitance (C1+C2) of the capacitance C1 (C in FIG. 2) of the ground layer section 101 and the conductive layer sections 103, the capacitances C2 (C in FIG. 2) of the conductive layer sections 103 and the power-source layer section 102, and the resistor R2" in a case referring to FIG. 2, the entire communication unit 100 becomes a network where impedances which keep the same frequency character are coupled. Accordingly, the frequency dependency is eliminated, which brings about an advantage such that the disruption of a waveform to be transmitted to the adjoining conductive layer sections 103 can be eliminated.

SEVENTH EMBODIMENT

In the above-described embodiments, it is assumed that the power source is a positive power source, the electric potential of the power-source layer section 102 to the ground layer section 101 is positive, and the pull resistor section 104 pulls up electric potential, but the relationship between positive and negative may be inverted. That is, the power source is a negative power source, and the pull resistor section 104 pulls down electric potentials.

In the above described embodiments, the communication element lets a current to flow between the ground layer section 101 and the conductive layer sections 103 to change the electric potentials of the conductive layer sections 103, but the current may be allowed to flow between the power-source layer section 102 and the conductive layer sections 103 to change the electric potentials of the conductive layer sections 103.

In addition, instead of filling a member with a predetermined resistivity as the pull resistor section 104, the pull resistor may be prepared in the communication element, and appropriately couple the individual layers.

Further, a sheet-like member whose resistivity changes locally may also be used as the pull resistor section 104. In this case, the average resistivity of an area corresponding to the pull resistor section 104 is a predetermined resistivity, and the average resistivity of the other areas are set extremely high (almost close to that of an insulator).

INDUSTRIAL APPLICABILITY

As explained above, the invention can provide a sheet-like communication unit that has a plurality of communication elements which are embedded in the communication unit, and transmits information as the communication elements communicate with neighboring communication elements to form a network.

This application claims priorities based on the following eleven Japanese Patent Applications, all of the disclosures of those eleven basic applications and the disclosure of the "Patent Literature 1" shall be incorporated in this application.
(1) Japanese Patent Application No. 2003-174076
(2) Japanese Patent Application No. 2003-189133
(3) Japanese Patent Application No. 2003-189117
(4) Japanese Patent Application No. 2003-284562
(5) Japanese Patent Application No. 2003-284582
(6) Japanese Patent Application No. 2003-284563
(7) Japanese Patent Application No. 2003-284541
(8) Japanese Patent Application No. 2003-284584
(9) Japanese Patent Application No. 2003-323300
(10) Japanese Patent Application No. 2004-107875
(11) Japanese Patent Application No. 2004-107876

The invention claimed is:

1. A communication unit comprising:
a ground layer section which is a sheet-like conductive material;
a power-source layer section which is a sheet-like conductive material laid out opposite to said ground layer section, and whose electric potential to said ground layer section becomes a predetermined reference electric potential;
a plurality of conductive layer sections which are sheet-like conductive materials laid out between said ground layer section and said power-source layer section;
a plurality of coupling resistor sections which are laid out between said ground layer section and said power-source layer section, and couple adjacent ones of said plurality of conductive layer sections with each other;
a plurality of pull resistor sections which couple said power-source layer section and said plurality of conductive layer sections, respectively; and
a plurality of communication elements which are respectively associated with said plurality of conductive layer sections, transmit information by changing electric potentials of said associated conductive layer sections to said ground layer section, and acquire said transmitted information by detecting changes in electric potentials to be propagated to those conductive layer sections which are adjacent to said associated conductive layer sections through any of said plurality of coupling resistor sections.

2. The communication unit according to claim 1,
wherein said plurality of conductive layer sections are laid out in such a manner as to sandwich said power-source layer section with said ground layer section or sandwich said ground layer section with said power-source layer section instead of being laid out between said ground layer section and said power-source layer section.

3. The communication unit according to claim 1,
wherein said coupling resistor section has an electrostatic capacity, and
impedances of individual sections in the communication unit are equal to one another.

4. The communication unit according to claim 1, including a coupling capacitor section having an electrostatic capacity instead of said coupling resistor section.

5. A communication unit comprising:
a ground layer section which is a sheet-like conductive material;
a power-source layer section which is a sheet-like conductive material laid out opposite to said ground layer section, and whose electric potential to said ground layer section becomes a predetermined reference electric potential;
a first conductive layer section and a second conductive layer section which are sheet-like conductive materials laid out between said ground layer section and said power-source layer section;
a coupling resistor section which is laid out between said ground layer section and said power-source layer section, and couples said first conductive layer section and said second conductive layer section with each other;
a first pull resistor section which couples said power-source layer section and said first conductive layer section;
a second pull resistor section which couples said power-source layer section and said second conductive layer section;
a first communication element section which changes an electric potential of said first conductive layer section to said ground layer section in accordance with information to be transmitted; and
a second communication element section which acquires said transmitted information by detecting a change in electric potential to be propagated to said second conductive layer section through said coupling resistor section as said electric potential of said first conductive layer section to said ground layer section changes.

6. The communication unit according to claim 5,
wherein said first communication element section lets a current to flow between said first communication element section and said ground layer section to change the electric potential of said first conductive layer section to said ground layer section, and said second communication element section compares electric potentials of said second communication element section to said ground layer section with said predetermined reference electric potential, and detects a change in electric potential.

7. The communication unit according to claim 5, wherein said plurality of conductive layer sections are laid out in such a manner as to sandwich said power-source layer section with said ground layer section or sandwich said ground layer section with said power-source layer section instead of being laid out between said ground layer section and said power-source layer section.

8. The communication unit according to claim 5, wherein said coupling resistor section has an electrostatic capacity, and impedances of individual sections in said communication unit are equal to one another.

9. The communication unit according to claim 5, including a coupling capacitor section having an electrostatic capacity instead of said coupling resistor section.

10. The communication unit according to claim 6, wherein said first communication element section and said second communication element section are operated with a potential difference between said power-source layer section and said ground layer section as power.

11. The communication unit according to claim 6, wherein said first conductive layer section, said second conductive layer section and said coupling resistor section constitute a sheet-like signal layer section which is laid out between said ground layer section and said power-source layer section, and said first communication element and said second communication element are operated with a potential difference between said signal layer section and said ground layer section as a power.

12. The communication unit according to claim 6, wherein said first conductive layer section and said second conductive layer section have approximately square shapes, and said first communication element and said second communication element are respectively laid out at centers of said first conductive layer section and second conductive layer section.

13. The communication unit according to claim 7, wherein said first communication element section lets a current to flow between said first communication element section and said ground layer section to change the electric potential of said first conductive layer section to said ground layer section, and said second communication element section compares electric potentials of said second communication element section to said ground layer section with said predetermined reference electric potential, and detects a change in electric potential.

14. The communication unit according to claim 7, wherein said first conductive layer section and said second conductive layer section have approximately square shapes, and said first communication element and said second communication element are respectively laid out at centers of said first conductive layer section and second conductive layer section.

15. The communication unit according to claim 11, wherein said signal layer section comprises a sheet-like conductive material whose resistivity changes locally, and an average resistivity of an area of said sheet-like conductive material corresponding to said first conductive layer section and said second conductive layer section is smaller than an average resistivity of an area of said sheet-like conductive material corresponding to said coupling resistor section.

16. The communication unit according to claim 13, wherein said first communication element section and second communication element section are operated with a potential difference between said power-source layer section and said ground layer section as power.

17. The communication unit according to claim 13, wherein said first conductive layer section, said second conductive layer section and said coupling resistor section constitute a sheet-like signal layer section which is laid out between said ground layer section and said power-source layer section, and said first communication element and said second communication element are operated with a potential difference between said signal layer section and said ground layer section as power.

18. The communication unit according to claim 16, wherein said signal layer section comprises a sheet-like conductive material whose resistivity changes locally, and an average resistivity of an area of said sheet-like conductive material corresponding to said first conductive layer section and said second conductive layer section is smaller than an average resistivity of an area of said sheet-like conductive material corresponding to said coupling resistor section.

* * * * *